(12) United States Patent
Dudebout et al.

(10) Patent No.: US 11,306,659 B2
(45) Date of Patent: Apr. 19, 2022

(54) PLUG RESISTANT EFFUSION HOLES FOR GAS TURBINE ENGINE

(71) Applicant: HONEYWELL INTERNATIONAL INC., Morris Plains, NJ (US)

(72) Inventors: Rodolphe Dudebout, Phoenix, AZ (US); Nagaraja Rudrapatna, Chandler, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 254 days.

(21) Appl. No.: 16/423,579

(22) Filed: May 28, 2019

(65) Prior Publication Data

US 2020/0378305 A1 Dec. 3, 2020

(51) Int. Cl.
| | |
|---|---|
| *F02C 7/18* | (2006.01) |
| *F01D 5/18* | (2006.01) |
| *F23R 3/06* | (2006.01) |
| *F23R 3/00* | (2006.01) |

(52) U.S. Cl.
CPC ............. *F02C 7/18* (2013.01); *F01D 5/18* (2013.01); *F01D 5/186* (2013.01); *F23R 3/002* (2013.01); *F23R 3/06* (2013.01); *F05D 2260/201* (2013.01); *F05D 2260/202* (2013.01); *F05D 2260/2214* (2013.01); *F05D 2260/607* (2013.01); *F23R 2900/00004* (2013.01); *F23R 2900/03041* (2013.01); *F23R 2900/03042* (2013.01); *F23R 2900/03044* (2013.01)

(58) Field of Classification Search
CPC ...... F23R 3/002; F23R 3/06; F05D 2260/202; F05D 2260/607; F01D 5/18; F01D 5/186
See application file for complete search history.

(56) References Cited

U.S. PATENT DOCUMENTS

| | | | | |
|---|---|---|---|---|
| 3,811,276 | A * | 5/1974 | Caruel | F23R 3/08 60/757 |
| 4,738,588 | A * | 4/1988 | Field | F01D 5/186 416/97 R |
| 4,992,025 | A * | 2/1991 | Stroud | F01D 5/186 416/97 R |

(Continued)

FOREIGN PATENT DOCUMENTS

| | | |
|---|---|---|
| EP | 2568118 A1 | 3/2013 |
| EP | 2759772 A1 | 7/2014 |

(Continued)

*Primary Examiner* — Alain Chau
(74) *Attorney, Agent, or Firm* — Lorenz & Kopf, LLP

(57) ABSTRACT

An effusion cooling hole for a component associated with a gas turbine engine extends along a longitudinal axis. The effusion cooling hole includes an inlet section spaced apart from a first surface of the component. The inlet section includes a face orientated transverse to the first surface and defines an inlet through the face that has a first diameter. The effusion cooling hole includes an outlet at a second surface of the component and downstream from the inlet section. The effusion cooling hole includes a diverging section downstream from the inlet section and upstream from the outlet. The diverging section is defined substantially external to a thickness of the component, and the effusion cooling hole transitions from the first diameter to a second diameter at the diverging section. The effusion cooling hole includes an intermediate section that fluidly connects the diverging section to the outlet.

20 Claims, 10 Drawing Sheets

(56) References Cited

U.S. PATENT DOCUMENTS

| | | | | |
|---|---|---|---|---|
| 5,096,379 | A * | 3/1992 | Stroud | F01D 5/186 416/97 R |
| 5,223,320 | A | 6/1993 | Richardson | |
| 6,708,499 | B2 * | 3/2004 | Pidcock | F23R 3/002 60/752 |
| 6,857,275 | B2 * | 2/2005 | Pidcock | F23R 3/002 60/752 |
| 7,000,397 | B2 * | 2/2006 | Pidcock | F23R 3/002 60/752 |
| 7,186,085 | B2 * | 3/2007 | Lee | F01D 5/186 416/97 R |
| 7,820,267 | B2 * | 10/2010 | Fahndrich | F01D 5/186 428/131 |
| 8,281,600 | B2 | 10/2012 | Chen et al. | |
| 9,518,738 | B2 * | 12/2016 | Gerendas | F23R 3/06 |
| 9,957,811 | B2 * | 5/2018 | Hucker | F01D 9/065 |
| 9,969,009 | B2 * | 5/2018 | Luketic | F01D 25/12 |
| 9,970,319 | B2 * | 5/2018 | Koonankeil | F01D 25/12 |
| 10,429,069 | B2 * | 10/2019 | Gerendas | F23R 3/005 |
| 10,669,896 | B2 * | 6/2020 | Propheter-Hinckley | F01D 25/32 |
| 10,731,562 | B2 * | 8/2020 | Porter | F02C 7/18 |
| 2008/0271457 | A1 | 11/2008 | McMasters et al. | |
| 2009/0053464 | A1 * | 2/2009 | Fahndrich | B23K 26/384 428/131 |
| 2010/0192588 | A1 * | 8/2010 | Gerendas | B23K 26/389 60/752 |
| 2010/0263384 | A1 * | 10/2010 | Chila | F23R 3/10 60/755 |
| 2014/0238030 | A1 * | 8/2014 | Gerendas | F23R 3/06 60/754 |
| 2015/0315930 | A1 * | 11/2015 | Koonankeil | F01D 25/12 415/116 |
| 2016/0123156 | A1 * | 5/2016 | Hucker | F23R 3/002 60/806 |
| 2016/0193667 | A1 * | 7/2016 | Luketic | B23P 15/04 29/558 |
| 2017/0176006 | A1 | 6/2017 | Gerendas | |
| 2017/0306764 | A1 * | 10/2017 | Konitzer | F01D 5/147 |
| 2018/0306114 | A1 | 10/2018 | Dudebout et al. | |
| 2019/0017440 | A1 | 1/2019 | Porter et al. | |
| 2019/0218940 | A1 * | 7/2019 | Propheter-Hinckley | F01D 5/186 |

FOREIGN PATENT DOCUMENTS

| | | |
|---|---|---|
| EP | 2942487 A1 | 11/2015 |
| JP | 2014148938 A | 8/2014 |
| WO | 9525932 A1 | 9/1995 |

\* cited by examiner

PLUG RESISTANT EFFUSION HOLES FOR GAS TURBINE ENGINE

TECHNICAL FIELD

The present disclosure generally relates to gas turbine engines, and more particularly relates to plug resistant effusion cooling holes for components associated with a gas turbine engine.

BACKGROUND

Gas turbine engines may be employed to power various devices. For example, a gas turbine engine may be employed to power a mobile platform, such as an aircraft. Generally, gas turbine engines have an engine core, in which gas is combusted to generate a hot gas flow that is expanded through a turbine. Certain components of the gas turbine engine, such as the combustor liner, turbine blades, etc. include portions that experience the full effect of the hot combusted gas flow. In order to regulate the temperature of these components, and therefore reduce the impact of the hot combusted gas flow, one or more cooling features may be employed. In certain operating environments, such as desert operating environments, the gas turbine engine may ingest fine sand and dust particles. These ingested fine sand and dust particles may pass through portions of the gas turbine engine and may accumulate in cooling features. The accumulation of the fine sand and dust particles in the cooling features may impede the cooling of the component, which in turn, may reduce the life of the component leading to increased repair costs and downtime for the gas turbine engine.

Accordingly, it is desirable to provide a cooling feature, such as an effusion cooling hole, for a hot-section component of a gas turbine engine, such as a combustor liner of a combustor, a turbine blade of a turbine and the like, which is resistant to plugging or the accumulation of fine sand and dust particles and maintains the same cooling efficiency. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is an effusion cooling hole for a component associated with a gas turbine engine. The component includes a wall having a cold, first surface opposite a hot, second surface and a thickness defined between the first surface and the second surface. The effusion cooling hole extends along a longitudinal axis. The effusion cooling hole includes an inlet section spaced apart from the first surface. The inlet section includes a face orientated transverse to the first surface and defines an inlet through the face that is symmetric along the longitudinal axis, and the inlet has a first diameter. The effusion cooling hole includes an outlet at the second surface and downstream from the inlet section, and the outlet is configured to form a film of a cooling fluid on the second surface the outlet. The effusion cooling hole includes a diverging section downstream from the inlet section and upstream from the outlet. The diverging section is defined substantially external to the thickness, and the effusion cooling hole transitions from the first diameter to a second diameter at the diverging section. The second diameter is larger than the first diameter. The effusion cooling hole includes an intermediate section that fluidly connects the diverging section to the outlet, and the intermediate section defined at least through the thickness and having the second diameter.

The face is planar and extends along a first axis that is transverse to the longitudinal axis and the first surface. The first axis is at a first angle relative to the first surface, and the first angle is between 10 degrees and 25 degrees. The longitudinal axis is transverse to a first normal of the first surface and is transverse to a second normal of the second surface such that the inlet of the effusion cooling hole is offset from the outlet of the effusion cooling hole and the effusion cooling hole is angled through the wall of the component. The diverging section is defined wholly external to the thickness and a portion of the intermediate section is defined external to the thickness. The diverging section is defined such that greater than 80% of the diverging section is external to the thickness. The outlet has a third diameter, which is greater than the second diameter and the first diameter. The inlet is defined through the face to define a corner, the corner having a first angle that is between 45 and 90 degrees. The effusion cooling hole further comprises a guide flange that surrounds and extends outwardly from the face. The inlet includes a taper that extends from the face to the first diameter. The face is planar, extends about a perimeter of the inlet and is configured such that cooling fluid enters the inlet normal to the face. The component is at least one of a turbine blade associated with the gas turbine engine, an inner liner of a combustor associated with the gas turbine engine and an outer liner of a combustor associated with the gas turbine engine. The diverging section has a first length, the intermediate section has a second length, and the second length is greater than the first length. The diverging section forms a vena *contracta* that is configured to inhibit the accumulation of fine particles within the effusion cooling hole.

Further provided according to various embodiments is an effusion cooling hole for a component associated with a gas turbine engine. The component includes a wall having a cold, first surface opposite a hot, second surface and a thickness defined between the first surface and the second surface. The effusion cooling hole extends along a longitudinal axis and is angled relative to the second surface. The effusion cooling hole includes an inlet section spaced apart from the first surface. The inlet section includes a planar face orientated transverse to the first surface and defining an inlet through the planar face that is symmetric along the longitudinal axis, the inlet having a first diameter. The effusion cooling hole includes an outlet at the second surface and downstream from the inlet section, and the outlet is configured to form a film of a cooling fluid on the second surface. The effusion cooling hole includes a diverging section downstream from the inlet section and upstream from the outlet. The diverging section is defined substantially external to the thickness, and the effusion cooling hole transitions from the first diameter to a second diameter at the diverging section. The second diameter is larger than the first diameter and the diverging section has a first length. The effusion cooling hole includes an intermediate section that fluidly connects the diverging section to the outlet. The intermediate section defined at least through the thickness, the intermediate section has the second diameter and the intermediate section has a second length that is greater than the first length of the diverging section.

The diverging section is defined wholly external to the thickness and a portion of the intermediate section is defined external to the thickness. The diverging section is defined such that greater than 80% of the diverging section is external to the thickness. The outlet has a third diameter, which is greater than the second diameter and the first diameter. The planar face extends along a first axis transverse to the longitudinal axis and the first surface, the first axis is at a first angle relative to the first surface, and the first angle is between 10 degrees and 25 degrees.

Also provided according to various embodiments is an effusion cooling hole for a component associated with a gas turbine engine. The component includes a wall having a cold, first surface opposite a hot, second surface and a thickness defined between the first surface and the second surface. The effusion cooling hole extends along a longitudinal axis and is angled relative to the second surface. The effusion cooling hole includes an inlet section spaced apart from the first surface. The inlet section includes a planar face orientated along a first axis transverse to the first surface and the longitudinal axis, and the inlet section defines an inlet through the planar face that is symmetric along the longitudinal axis. The planar face surrounds the inlet and the inlet has a first diameter. The effusion cooling hole includes an outlet at the second surface and downstream from the inlet section. The outlet is configured to form a film of a cooling fluid on the second surface, and the outlet has a third diameter. The effusion cooling hole includes a diverging section downstream from the inlet section and upstream from the outlet and the diverging section is defined wholly external to the thickness. The effusion cooling hole transitions from the first diameter to a second diameter at the diverging section, and the second diameter is larger than the first diameter and smaller than the third diameter. The diverging section has a first length. The effusion cooling hole includes an intermediate section that fluidly connects the diverging section to the outlet. The intermediate section defined at least through the thickness, the intermediate section having the second diameter and the intermediate section has a second length that is greater than the first length of the diverging section.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
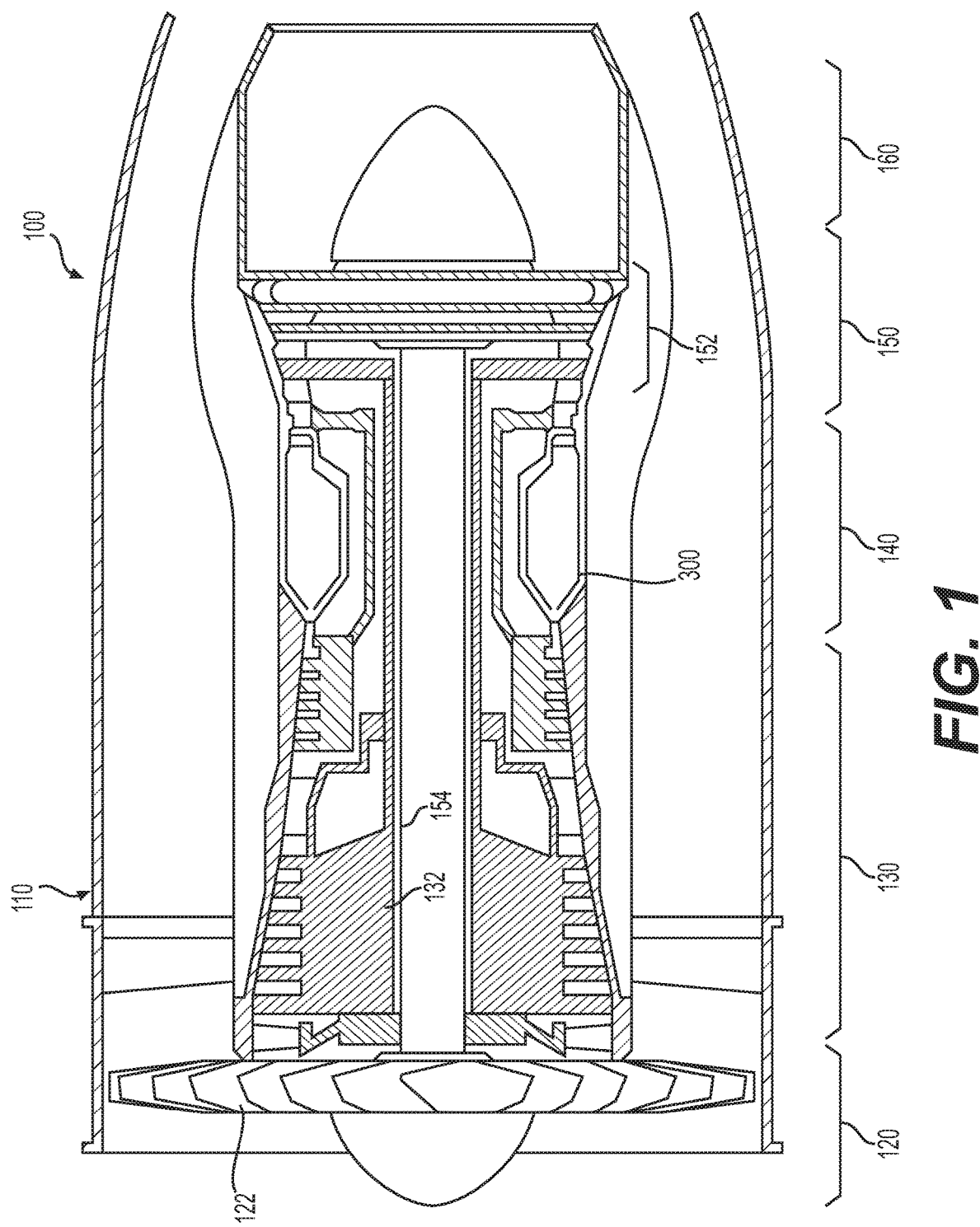
FIG. 1 is a schematic cross-sectional illustration of a gas turbine engine, which includes a combustion section and a turbine section having a plurality of exemplary plug resistant effusion cooling holes in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of component associated with a gas turbine engine that would benefit from having a particle plugging resistant cooling feature, such as an effusion hole, and the plug resistant effusion cooling hole described herein for a combustor or a turbine blade of a gas turbine engine is merely one exemplary embodiment according to the present disclosure. In addition, while the plug resistant effusion cooling hole is described herein as being used with a gas turbine engine used for propulsion or power generation onboard a mobile platform, such as a bus, motorcycle, train, motor vehicle, marine vessel, aircraft, rotorcraft and the like, the various teachings of the present disclosure can be used with a gas turbine engine on a stationary platform or for stationary power generation. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

FIG. 1 is a simplified, cross-sectional view of a gas turbine engine 100 according to an exemplary embodiment. The gas turbine engine 100 may be disposed in an engine case 110 and may include a fan section 120, a compressor section 130, a combustor section 140, a turbine section 150, and an exhaust section 160. As will be discussed, the combustor section 140 and/or the turbine section 150 includes one or more plug resistant effusion holes or effusion cooling holes 400, which provide cooling for a portion of the combustor section 140 and/or a portion of the turbine section 150 while inhibiting plugging of the effusion cooling holes 400 with ingested sand or fine dust particles. By providing the effusion cooling holes 400, the temperatures of the portion of the combustor section 140 and/or the portion of the turbine section 150 are regulated, which improves useful life and reduces maintenance costs.

With continued reference to FIG. 1, the fan section 120 may include a fan 122, which draws in and accelerates at least a portion of the air into the compressor section 130. The compressor section 130 may include a series of compressors 132 that raise the pressure of the air directed from the fan 122. The compressors 132 then direct the compressed air into the combustor section 140. In the combustor section 140, the high pressure air is mixed with fuel and combusted. The combusted air is then directed into the turbine section 150.

The turbine section 150 may include a series of turbines 152, which may be disposed in axial flow series. The combusted air from the combustor section 140 expands through and rotates the turbines 152 prior to being exhausted through the exhaust section 160. In one embodiment, the turbines 152 rotate to drive equipment in the gas turbine engine 100 via concentrically disposed shafts or spools. In one example, the turbines 152 may drive the compressors 132 via one or more rotors 154. FIG. 1 depicts one exemplary configuration, and other embodiments may have alternate arrangements. The exemplary embodiments discussed herein are not limited to use in conjunction with a particular type of turbine engine.

Figure 2A:
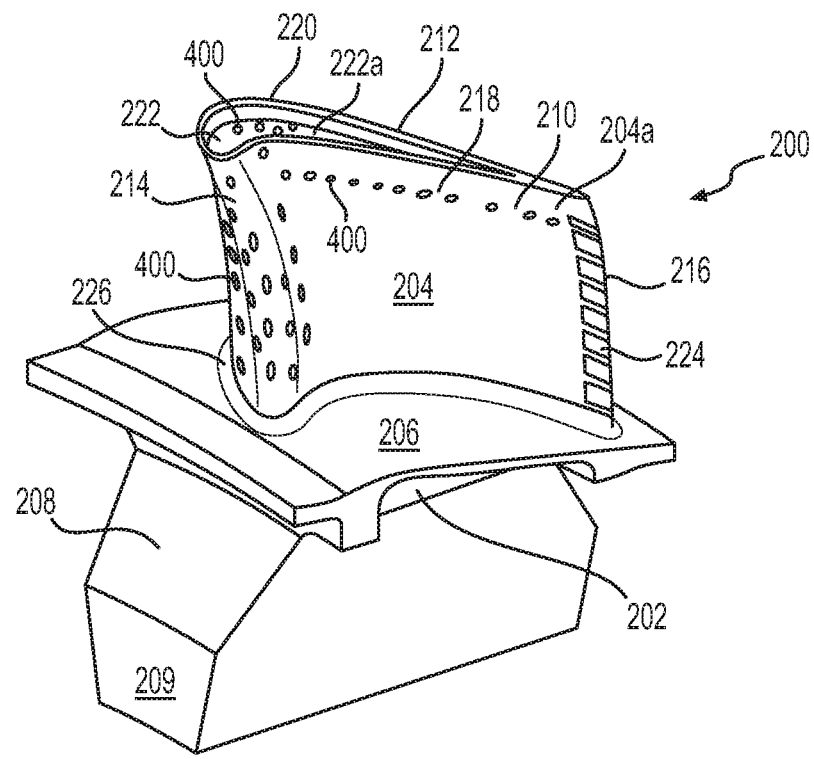
FIGS. 2A and 2B illustrate a turbine blade associated with the turbine section of FIG. 1, which includes the plurality of plug resistant effusion cooling holes, in accordance with various embodiments.
Figure 2B:
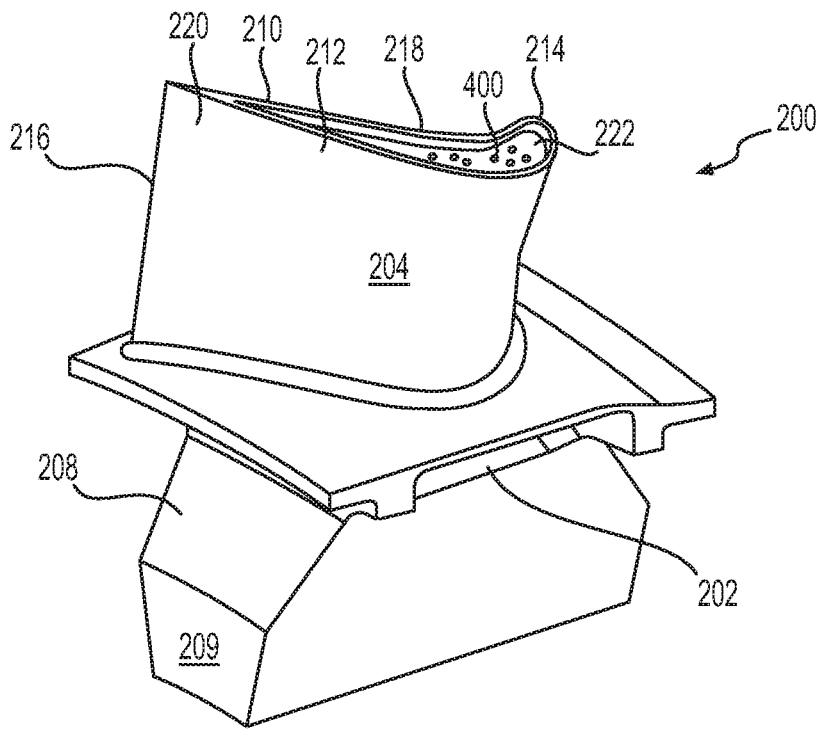

The effusion cooling holes 400 of the present disclosure may be used with any suitable component associated with the gas turbine engine 100. In one example, the components of the gas turbine engine 100 that include the effusion cooling holes 400 may comprise, but are not limited to, turbine rotor blades, turbine stator vanes of the turbine section 150 and a combustor liner of the combustor section 140. For example, FIGS. 2A and 2B illustrate an exemplary turbine blade 200 that includes the effusion cooling holes 400. In this example, the turbine blade 200 includes a shank 202, an airfoil 204, a platform 206, and a root 208. The platform 206 is configured to radially contain turbine airflow. The root 208 provides an area in which a firtree 209 is provided. The firtree 209 is used to attach the turbine blade 200 to a turbine rotor disc (not illustrated). It will be appreciated that in other embodiments, any one of numerous other shapes suitable for attaching the turbine blade 200 to the turbine disk, may be alternatively provided therein. The airfoil 204 has a concave outer wall 210 and a convex outer wall 212, each having outer surfaces that together define an airfoil shape. The airfoil shape includes a leading edge 214, a trailing edge 216, a pressure side 218 along the concave outer wall 210, a suction side 220 along the convex outer wall 212, a blade tip 222, one or more trailing edge slots 224, and an airfoil platform fillet 226. In one example, the effusion cooling holes 400 may be provided variously along the turbine blade 200, for example along the concave outer wall 210 and the blade tip 222. It should be noted that the effusion cooling holes 400 may be provided at other locations along the turbine blade 200, if desired.

Figure 3B:
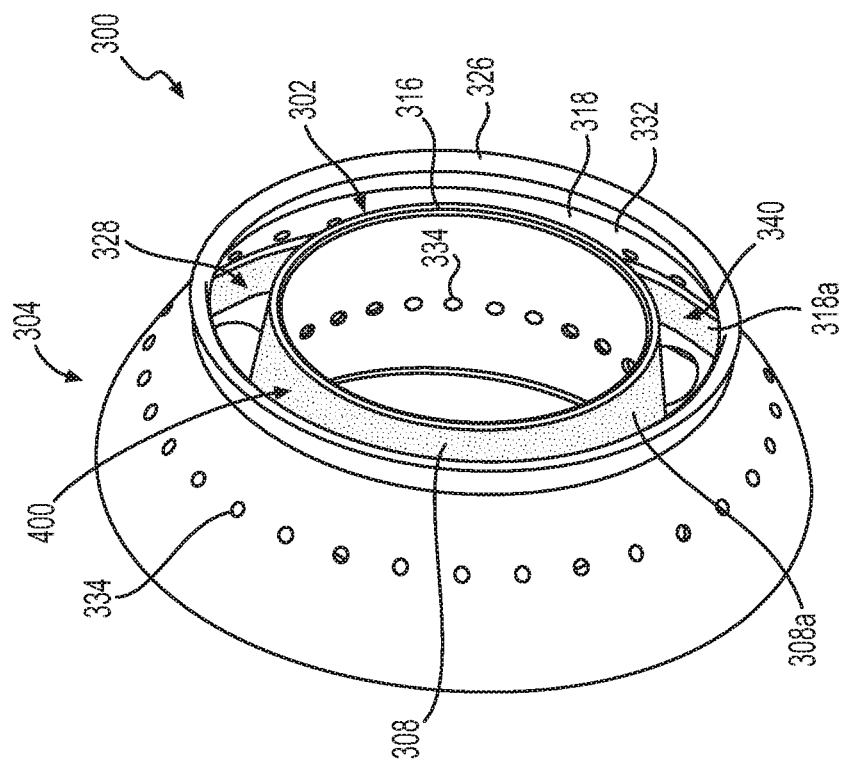
FIGS. 3A and 3B are perspective views of an exemplary combustor associated with the combustor section of FIG. 1, from an upstream end and a downstream end, respectively, which includes the plurality of plug resistant effusion cooling holes, in accordance with various embodiments.
Figure 3A:
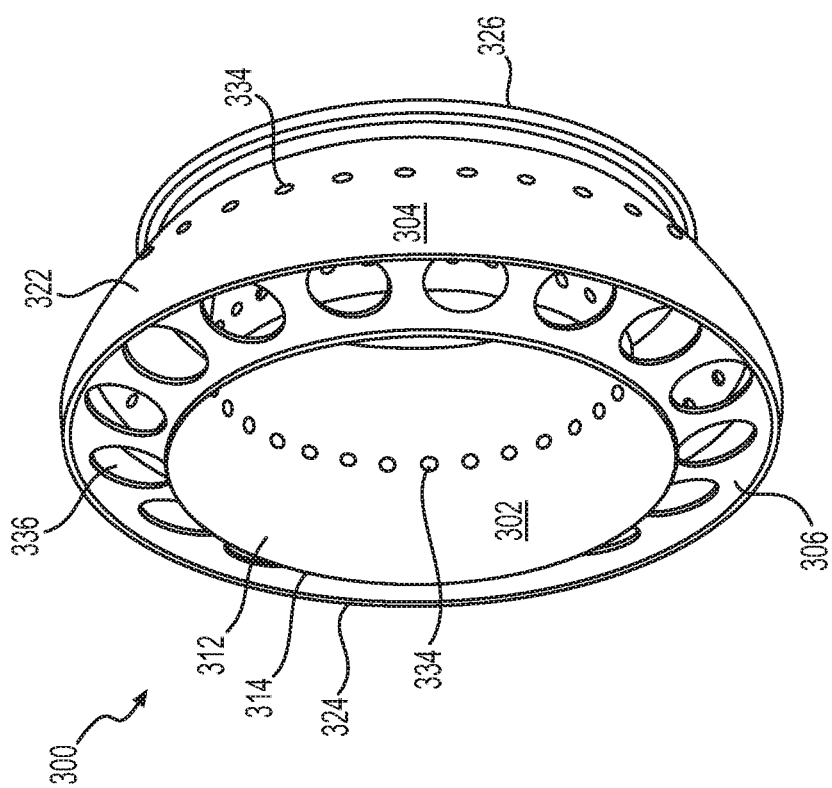

In another example, FIGS. 3A and 3B illustrate a combustor 300, which in the depicted embodiment is implemented as an annular combustor, including an inner liner 302, an outer liner 304, and a dome 306. The inner liner 302 includes an inner surface 308, an outer surface 312, an upstream end 314, and a downstream end 316. Similarly, the outer liner 304, which at least partially surrounds the inner liner 302, includes an inner surface 318, an outer surface 322, an upstream end 324, and a downstream end 326. The dome 306 is coupled between the upstream ends 314 and 324 of the inner liner 302 and outer liner 304, respectively, forming a combustion chamber 328 between the inner liner 302 and outer liner 304. The downstream ends 316 and 326 of the inner liner 302 and outer liner 304, respectively, form an opening 332 through which combusted air flows, and is directed into the turbine section 150. In the depicted embodiment, the inner liner 302 and outer liner 304 each include a circumferential row of dilution openings 334. The dilution openings 334, as is generally known, admit additional air into the combustion chamber 328 to establish combustor aerodynamics and cool the exhaust gases to acceptable levels before entering the turbine section 150. The dome 306 also includes a plurality of axially facing "swirler" assembly openings 336. In addition to the dilution openings 334, the inner liner 302 and outer liner 304 include the effusion cooling holes 400, in accordance with the various embodiments of the present disclosure, facing the combustion chamber 328.

While an exemplary turbine blade for the turbine section 150 (FIG. 1) and an exemplary combustor design for the combustor section 140 (FIG. 1) are illustrated herein for exemplary purposes, it will be appreciated that the effusion cooling holes 400 of the present disclosure may be used in any component associated with the gas turbine engine 100 (FIG. 1) that includes effusion air cooling. As also noted above, the engine components are subject to extremely high temperatures resulting from the combustion process. If unaddressed, the extreme heat may affect the useful life of components and/or impact the maximum operating temperature of the engine. As such, cooling features and/or mechanisms may be provided to maintain temperatures at acceptable levels. The effusion cooling holes 400 are examples of a cooling feature that maintains temperatures of the turbine blade 200 (FIGS. 2A and 2B) and the combustor 300 (FIGS. 3A and 3B) at acceptable levels.

In one example, the effusion cooling holes 400 are relatively small, closely spaced holes formed in various engine components, including one or both of the turbine blade 200 (FIGS. 2A and 2B) and the combustor 300 (FIGS. 3A and 3B). In this example, the effusion cooling holes 400 are defined within the turbine blade 200 (FIGS. 2A and 2B) and/or the inner liner 302 and outer liner 304 of the combustor 300 (FIGS. 3A and 3B) to provide cooling fluid to the turbine blade 200 (FIGS. 2A and 2B) and/or the inner liner 302 and outer liner 304 of the combustor 300 (FIGS. 3A and 3B). Generally, the effusion cooling holes 400 may be provided on "hot side" surfaces, i.e. those surfaces exposed to the hot gas flow path, of components associated with the gas turbine engine 100, such as those disclosed above. Effusion cooling involves a matrix of relatively small diameter effusion cooling holes 400 extending through the hot side surfaces to admit a flow of cooling fluid. Cooling fluid may be provided at an elevated pressure to the effusion cooling holes 400, for example, from a cooling fluid source aft of the fan section 120 or aft of the compressor section 130. The effusion cooling holes 400 are typically angled relative to the hot side surface of the component to generate a cooling film on the hot side surfaces of the components. This angle also increases the length of the effusion cooling holes 400 through the components, which increases the surface area from which the cooling flow removes heat from the components. Thus, the effusion cooling holes 400 may also be referred to as "angled cooling holes." These effusion cooling holes 400 serve to direct a flow of relatively cool fluid, such as air, from the cooling fluid source onto a hot surface such as surface 222*a*, 204*a* of the turbine blade 200 (FIG. 2A); and a hot surface 308*a*, 318*a* of the inner liner 302 and outer liner 304. As best shown in FIG. 3, the effusion cooling holes 400 are typically angled at, for example, about 1 degree to about 55 degrees (for example, about 45 degrees) to a hot surface 402 (for example, the surface 222*a*, 204*a* of the turbine blade 200 (FIG. 2A) and/or the hot surface 308*a*, 318*a* of the inner liner 302 and outer liner 304 (FIG. 3B)) and may be oriented to discharge at various angles relative to the hot gas flow, such that a film of cooling air forms on the hot surface 402 (for example, the surface 222*a*, 204*a* of the turbine blade 200 (FIG. 2A) and/or the hot surface 308*a*, 318*a* of the inner liner 302 and outer liner 304 (FIG. 3B)). The film of cooling air functions to protect the turbine blade 200 (FIG. 2A) and the inner liner 302 and outer liner 304 (FIG. 3B) from the elevated temperatures of the combustion gases. Effusion cooling may also be used in other components, including combustor domes, heat shields, and other turbine components, and the effusion (or angled) cooling holes 400 discussed herein are applicable to those components, e.g., the effusion cooling holes 400 may be associated with the body of such components exposed to combustion gases to direct cooling air from a first (or outside) surface, through the body, and to a second (or inside) surface to form a film of cooling air over the respective component.

Given the relatively small size, conventional effusion cooling holes tend to become partially or completely blocked by particles (e.g., dust, sand, and/or debris) flowing through the engine. According to the principles of the present disclosure, the shape of the effusion cooling holes 400 reduces or eliminates the accumulation of sand, fine dust and/or debris particles within the effusion cooling holes 400, which ensures adequate cooling of the turbine blade 200 (FIG. 2A) and/or the inner liner 302 and outer liner 304 (FIG. 3B). Generally, as discussed, the effusion cooling holes 400 each receive cooling fluid or air from a cooling fluid source associated with the gas turbine engine 100, such as through bypass duct, for example. It should be noted that the effusion cooling holes 400 may be provided in any number, pattern, or configuration with regard to a particular component.

Figure 4:
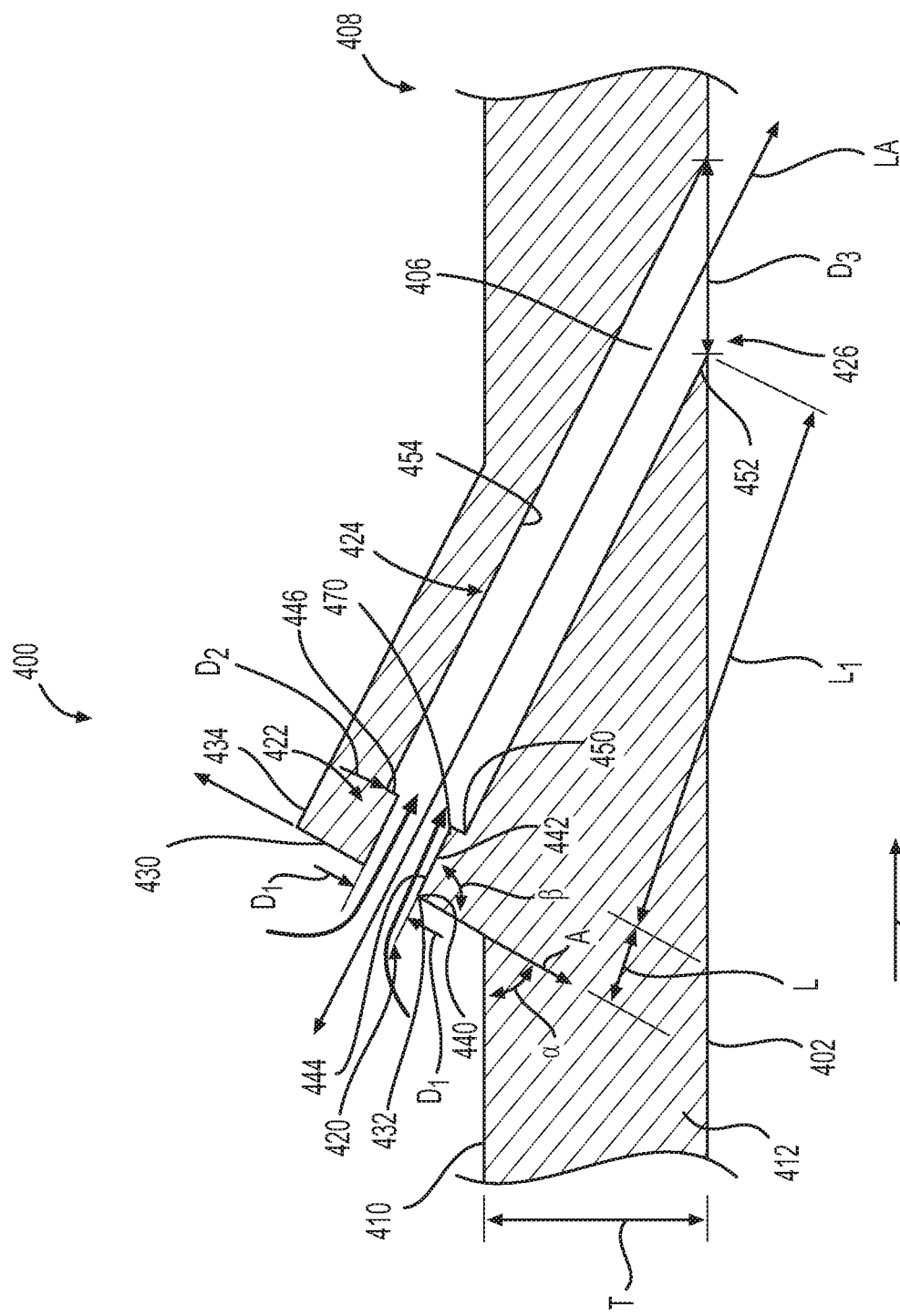
FIG. 4 is a cross-sectional view of one of the plug resistant effusion cooling holes associated with an exemplary component of the gas turbine engine of FIG. 1, such as the turbine blade of FIGS. 2A and 2B and/or the combustor of FIGS. 3A and 3B, in accordance with various embodiments.

FIG. 4 is a cross-sectional view of one of the effusion cooling holes 400 associated with turbine blade 200 (FIG. 2A) and/or the inner liner 302 and outer liner 304 (FIG. 3B). The cross-section showing the effusion cooling hole 400 is taken perpendicularly to the hot gas flow path (shown generally by arrow 404). The cooling fluid 406 (shown generally by the arrow) exits the effusion cooling hole 400 and joins with the hot gas flow path 404 for purposes of providing convection and conduction cooling to the hot surface 402 of a component 408. As used herein, the component 408 is any component associated with the gas turbine engine 100 that employs effusion cooling, including, but not limited to, the turbine blade 200 (FIG. 2A) and the inner liner 302 and outer liner 304 (FIG. 3B).

In this example, the component 408 includes a first or cold surface 410 and the opposite second or hot surface 402. The component 408 may also have a thickness T defined between the cold surface 410 and the hot surface 402. In one example, the thickness T is about 0.020 inches to about 0.030 inches, and for example, about 0.025 inches. The thickness T defines an interior or wall 412 of the component 408. Stated another way, the wall 412 is defined and extends between the hot surface 402 and the cold surface 410. In one example, each of the effusion cooling holes 400 is defined only partially through the wall 412 of the component 408, with a portion of each of the effusion cooling holes 400 extending above the cold surface 410. In other words, a portion of each of the effusion cooling holes 400 is defined outside of the thickness T of the wall 412 and is positioned above the cold surface 410 such that the portion of the effusion cooling holes 400 is not defined within the thickness T of the wall 412.

It should be understood that each of the effusion cooling holes 400 associated with the component 408 is the same, and for ease of description a single one of the effusion cooling holes 400 will be described and illustrated herein. In this example, the effusion cooling hole 400 includes an inlet section 420, a diverging section 422, an intermediate section 424 and an outlet 426. Additional portions or segments may be provided as necessary or desired. The effusion cooling hole 400 extends along a longitudinal axis LA, which is transverse or oblique to the cold surface 410. In this example, the longitudinal axis LA is at an angle of about 45 degrees relative to the cold surface 410. The longitudinal axis LA is transverse to a first normal of the cold surface 410 and is transverse to a second normal of the hot surface 402 such that the inlet section 420 of the effusion cooling hole 400 is offset from the outlet 426 of the effusion cooling hole 400.

In one example, the inlet section 420, the diverging section 422 and a portion of the intermediate section 424 are defined so as to be positioned exterior to or above the cold surface 410 of the component 408. Stated another way, the inlet section 420, the diverging section 422 and the portion of the intermediate section 424 are defined exterior of the wall 412 and outside of the thickness T of the wall 412. By defining the inlet section 420, the diverging section 422 and the portion of the intermediate section 424 outside of the wall 412, outside of the thickness T and exterior to the cold surface 410 of the component 408, the inlet section 420, the diverging section 422 and the portion of the intermediate section 424 may act as heat transfer fins, which further assist in cooling the component 408. In this example, the inlet section 420 and the diverging section 422 are defined wholly external to the thickness T or wholly exterior to the wall 412 to act as heat transfer fins to assist in cooling. Thus, generally, the diverging section 422 is defined such that greater than 80% of the diverging section 422 is external to the thickness T. It should be noted that in other embodiments, a portion of the inlet section 420 and/or the diverging section 422 may be defined within the thickness T, if desired.

Figure 4A:
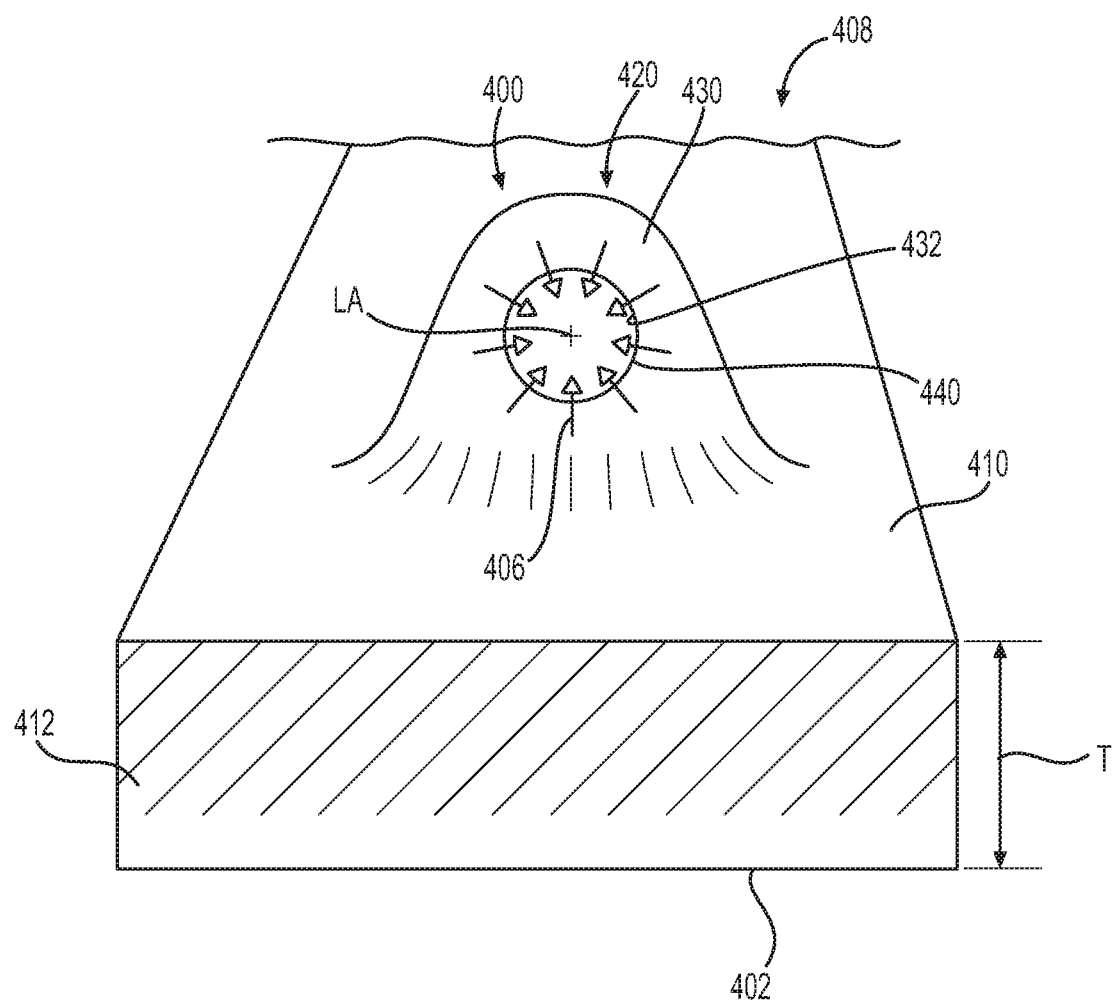
FIG. 4A is a detail perspective end view of the one of the plurality of plug resistant effusion cooling holes of FIG. 4, which illustrates an inlet section of the one of the plurality of plug resistant effusion cooling holes.

The inlet section 420 guides cooling fluid or air into the effusion cooling hole 400 and is spaced apart from the cold surface 410. The inlet section 420 is defined exterior to the wall 412, which enables a reduction in the thickness T (FIG. 4A). In one example, the inlet section 420 includes a face 430 and defines an inlet or opening 432. In this example, the face 430 is planar, and is orientated along an axis A. In this example, the face 430 is symmetric relative to the longitudinal axis LA. The axis A is transverse to the cold surface 410, and in one example, the axis A extends at a first angle or angle α relative to the cold surface 410. In this example, the angle α is between about 15 degrees to about 25 degrees, and in one example is about 20 degrees. It should be noted, however, that other angles may be suitable. The face 430 is sized to have a diameter D, which is different than a first diameter D1 of the opening 432. In one example, the face 430 has the diameter D, which is about 0.5 to about 3.0 times greater than the first diameter D1. The first diameter D1 is about 0.015 inches (in.) to about 0.025 inches (in.); and the diameter D is about 0.040 inches (in.) to about 0.100 inches (in.). Thus, revolving around the longitudinal axis LA, there is a distance of about 0.5 to about 3.0 times the first diameter D1 between the cold surface 410 and the opening 432. Generally, the planar face 430, which is angled at the angle α, causes the cooling fluid 406 to enter the opening 432 substantially normal to the face 430. By the cooling fluid 406 entering the opening 432 substantially normal to the face 430, fine particles entrained in the cooling fluid 406 are forced toward the center of the intermediate section 424, and thus, do not accumulate within the intermediate section 424. Generally, the intermediate section 424 has a larger, second diameter D2 than the diverging section 422 in order to discourage turbulent dispersion of fine dust near the longitudinal axis LA from migrating to an intermediate sidewall 454 of the intermediate section 424 and therefore depositing on the intermediate sidewall 454 of the intermediate section 424. This ensures that the effusion cooling holes 400 remain unplugged or free of fine particle accumulation during use.

With reference to FIG. 4A, the opening 432 is defined through the face 430. In one example, the opening 432 is circular, and is coaxially aligned with the longitudinal axis LA. Generally, the opening 432 is symmetric along the longitudinal axis LA. It should be noted that the opening 432 may have other shapes, if desired. In this example, the opening 432 is defined through the face 430 such that a corner 440 is defined about a perimeter of the opening 432. The corner 440 assists in directing the cooling fluid toward the center of the intermediate section 424. In one example, with reference back to FIG. 4, the corner 440 defines an angle β between a wall 442 of the diverging section 422 and the face 430. In this example, the angle β is about 90 degrees, such that the corner 440 is a sharp corner. The opening 432 is also defined off of the cold surface 410 (FIG. 4A). By positioning the opening 432 off of the cold surface 410 and exterior to the wall 412, the thickness T of the component 408 may be reduced in between the effusion cooling holes 400 in order to reduce the weight and material associated with the component 408.

The diverging section 422 is downstream of the opening 432 of the inlet section 420 and is upstream from the outlet 426 in the direction of the cooling fluid 406 flow. The diverging section 422 is generally cylindrical, with a circular cross-section, and is substantially symmetric to the longitudinal axis LA. The diverging section 422 is defined substantially external to the thickness T. In one example, the diverging section 422 is defined between about 80% to about 100% external to the thickness T, and thus, external to the wall 412. In this example, the diverging section 422 is defined wholly external to the thickness T (i.e. 100%). The diverging section 422 has a diverging section inlet 444 and a diverging section outlet 446. The wall 442 connects the diverging section inlet 444 with the diverging section outlet 446. The diverging section inlet 444 is in fluid communication with the opening 432 to receive the cooling fluid 406. The diverging section inlet 444 has the first diameter D1. The diverging section outlet 446 has the second diameter D2, which is different than the first diameter D1. In one example, the second diameter D2 is greater than the first diameter D1. The second diameter D2 is about 0.020 inches (in.) to about 0.030 inches (in.). The wall 442 is symmetric about the longitudinal axis LA, and is substantially cylindrical. As shown in FIG. 4, the effusion cooling hole 400 transitions from the first diameter D1 to the second diameter D2 at the diverging section 422. The diverging section 422 extends for a length L, which is different than a length L1 of the intermediate section 424. Generally, the length L is less than the length L1. In this example, the length L is about 0.010 inches (in.) to about 0.030 inches (in.); and the length L1 is about 0.09 inches (in.) to about 0.015 inches (in.). The diverging section inlet 444 is spaced apart from the diverging section outlet 446 by the length L.

The intermediate section 424 is downstream of the diverging section 422. The intermediate section 424 is generally cylindrical, with a circular cross-section, and is substantially symmetric to the longitudinal axis LA. The intermediate section 424 includes an intermediate inlet 450 upstream from an intermediate outlet 452. The intermediate inlet 450 is spaced apart from the intermediate outlet 452 by the length L1. Generally, the intermediate inlet 450 is in fluid communication with the diverging section outlet 446 of the diverging section 422, and the intermediate outlet 452 is in fluid communication with the outlet 426. The intermediate inlet 450 is defined external to the cold surface 410 and the wall 412, while a portion of the intermediate outlet 452 is defined within the wall 412. Stated another way, the intermediate inlet 450 is defined external to the thickness T. By providing a portion of the intermediate section 424 outside of or external to the cold surface 410 and the wall 412, the thickness T of the wall 412 may be reduced. The intermediate sidewall 454 interconnects the intermediate inlet 450 and the intermediate outlet 452. The intermediate sidewall 454 is substantially cylindrical, and a portion of the intermediate sidewall 454 is defined external or exterior to the wall 412 and the cold surface 410. In this example, the intermediate section 424 extends through an entirety of the thickness T and through an entirety of the wall 412, and terminates at the outlet 426, which is defined on the hot surface 402.

The outlet 426 is downstream of the intermediate section 424 and is in fluid communication with the intermediate outlet 452. The outlet 426 dispenses the cooling fluid or air onto the hot surface 402 of the component 408, and is configured to form a film of a cooling fluid on the hot surface 402. In one example, the outlet 426 is formed from an intersection of the intermediate section 424 having the second diameter D2 with the hot surface 402, yielding an elliptical shape at the outlet 426 with a third or major diameter D3. The major diameter D3 is different than each of the diameter D, the first diameter D1 and the second diameter D2. In one example, the major diameter D3 is greater than the first diameter D1 and the second diameter D2. The major diameter D3 is about 0.05 inches (in.) to about 0.1 inches (in.). In this example, the outlet 426 is substantially elliptical, however, the outlet 426 may have any desired shape to form a film of cooling fluid on the hot surface 402.

Figure 5:
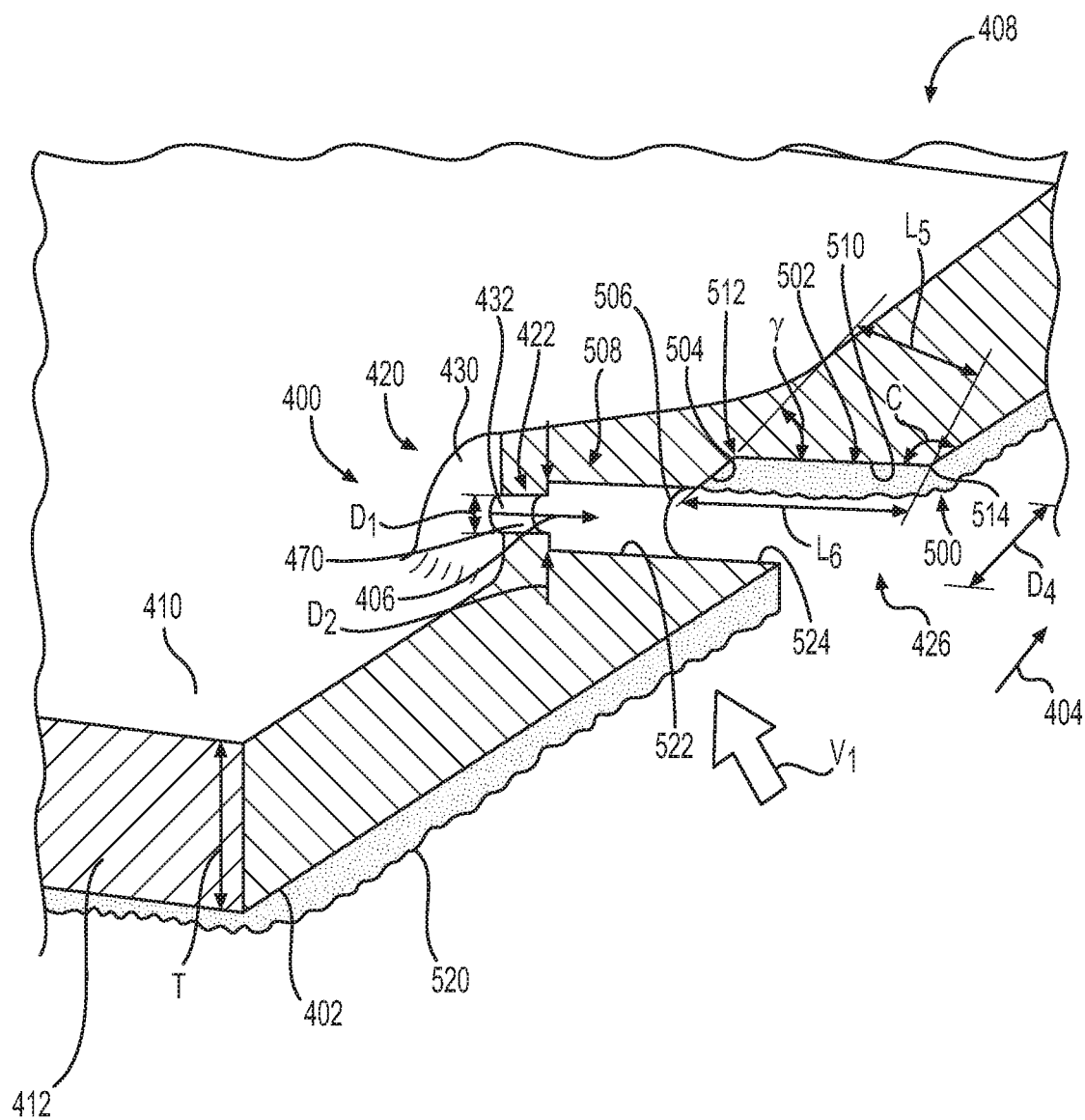
FIG. 5 is a cross-sectional view of the one of the plug resistant effusion cooling holes associated with the component of the gas turbine engine of FIG. 1, such as the turbine blade of FIGS. 2A and 2B and/or the combustor of FIGS. 3A and 3B, which includes an outlet configured to receive a thermal barrier coating in accordance with various embodiments.

For example, with reference to FIG. 5, the outlet 426 may be substantially similar or the same as the effusion cooling aperture 400 described in commonly-assigned U.S. Publication No. 2018/0306114 (U.S. application Ser. No. 15/495,663), titled "GAS TURBINE ENGINE COMPONENTS WITH AIR-COOLING FEATURES, AND RELATED METHODS OF MANUFACTURING THE SAME," and the relevant portion of this application is incorporated herein by reference. FIG. 5 is a cross-sectional view of the effusion cooling hole 400 taken through the effusion cooling hole 400 in the direction from the cold surface 410 to the hot surface 402. In the example of FIG. 5, the outlet 426 may include a trough 500 that has a recessed portion 502, which is a void area beginning at the hot surface 402 and extending inwardly therefrom (in a direction toward the cold surface 410). The outlet 426 in the example of FIG. 5 has a fourth diameter D4, which is greater than the second diameter D2 and the first diameter D1. In one example, the fourth diameter D4 is about 0.05 inches (in.) to about 0.1 inches (in.). The recessed portion 502 includes a forward surface 504, which is oriented transverse to the inward direction (and substantially parallel to the cold surface 410). The forward surface 504 surrounds and contains an outlet inlet 506, through which cooling fluid 406 received through the inlet section 420, the diverging section 422 and an intermediate section 508 exits into the recessed portion 502. The recessed portion 502 further includes an inward surface 510, which extends from the inward-most end 512 of the forward surface 504 to the hot surface 402, at point 514. In this example, the outlet 426 may be defined within the thickness T or within the wall 412, such that the intermediate section 508 does not extend completely through the thickness T as shown in FIG. 4.

The inward surface 510 extends at an angle c, defined with reference to a hot gas flow path direction 404 (as well as the hot surface 402), which may be from about 20 degrees to about 70 degrees, such as about 30 degrees to about 60 degrees. Furthermore, the forward surface 504 defines an angle $\gamma$, defined with reference to the hot gas flow path direction 404 (as well as the hot surface 402), which is 90 degrees in some embodiments, or is greater than 90 degrees in other embodiments, such as from 91 degrees to 135 degrees. An entirety of the forward surface 504 is provided at the angle $\gamma$. The inward-most end 512 of the forward surface 504, when measured against the hot surface 402, defines a length L5 in the inward direction. Furthermore, the recessed portion 502 spans a length L6 from the forward surface 504 to the point 514, defined with reference to the hot gas flow path direction 404 (as well as the hot surface 402). The length L5 is different than the length L6, and may be from about 20 percent to about 80 percent of length L6, such as from about 30 percent to about 70 percent. In certain embodiments, the outlet 426 further includes an overhang portion that extends aftward over the recessed portion 502 beginning from the forward surface 504. In this example, the overhang portion defines a length of the outlet 426. The overhang portion includes an outer surface, which is an extension of the hot surface 402 as it extends over the recessed portion 502. The outer surface may be inclined with respect to the hot surface 402, if desired. The overhang portion inhibits the plugging of the outlet inlet 506 during the application of an optional coating, such as a thermal barrier coating 520, discussed below.

Generally, the effusion cooling hole 400 may be oriented in any suitable direction relative to local or mainstream air flows. For example, the effusion cooling holes 400 may be orientated in a substantially clockwise orientation relative to the cold surface 410. In some exemplary embodiments, the effusion cooling hole 400 may be considered to have a first side and a second side with respect to this dimension. Based on the general orientation of the effusion cooling hole 400 relative to the cold surface 410, the first side may also be referred to as the obtuse side, and the second side may also be referred to as the acute side. As shown in FIGS. 4 and 5, the outlet 426 of each of the effusion cooling holes 400 cooperates to form a film of cooling fluid over the hot surface 402 of the component 408.

In one example, with reference to FIG. 4, the component 408 is formed with a plurality of the effusion cooling holes 400 extending exterior to the cold surface 410 and with the portion of the intermediate section 424 extending through the wall 412 to the outlet 426 in a predetermined density and orientation to provide a predetermined amount of cooling for the component 408. In this example, the effusion cooling holes 400 and the component 408 are composed of a metal or metal alloy, including, but not limited to nickel or cobalt based alloys. The effusion cooling holes 400 and the component 408 are formed through additive manufacturing, including, but not limited to direct metal laser sintering (DMLS), directed energy deposit (DED), laser powder bed fusion (L-PBF), electron powder bed fusion (E-PBF) or electron beam melting (EBM). In one example, the effusion cooling holes 400 and the component 408 are formed through additive manufacturing employing the method 500 described in commonly-assigned U.S. Publication No. 2018/0306114 (U.S. application Ser. No. 15/495,663), titled "GAS TURBINE ENGINE COMPONENTS WITH AIR-COOLING FEATURES, AND RELATED METHODS OF MANUFACTURING THE SAME," and the relevant portion of this application is incorporated herein by reference. The shape of the effusion cooling holes 400 enables the effusion cooling holes 400 to be self-supporting during formation through additive manufacturing. In addition, the position of the face 430 of the inlet section 420 assist in the formation of the effusion cooling holes 400 through additive manufacturing as the face 430 of the inlet sections 420 of the effusion cooling holes 400 are sufficiently small and at an angle conducive to build by layer.

Optionally, with reference to FIG. 5, once the component 408 and the effusion cooling holes 400 are formed, the thermal barrier coating 520 may be applied to the hot surface 402 of the component 408. The thermal barrier coating 520 generally improves the heat resistance of the component 408 and the effusion cooling holes 400. In one example, the thermal barrier coating 520 comprises the thermal barrier coating 750 described in commonly-assigned U.S. Publication No. 2018/0306114 (U.S. application Ser. No. 15/495, 663), titled "GAS TURBINE ENGINE COMPONENTS WITH AIR-COOLING FEATURES, AND RELATED METHODS OF MANUFACTURING THE SAME," and the relevant portion of this application is incorporated herein by reference. In this example, the thermal barrier coating 520 is applied by plasma spray coating, but it should be appreciated that other techniques may be employed to apply the thermal barrier coating 520. The application of the thermal barrier coating 520 to the hot surface 402 may result in the thermal barrier coating 520 covering a portion of the trough 500. In one example, a spray vector V1 for applying the thermal barrier coating 520 is substantially parallel to the forward surface 504 of the outlet inlet 506. The length of the outlet 426 defined by the overhang portion may prohibit or prevent the thermal barrier coating 520 from plugging the effusion cooling holes 400.

Figure 6:
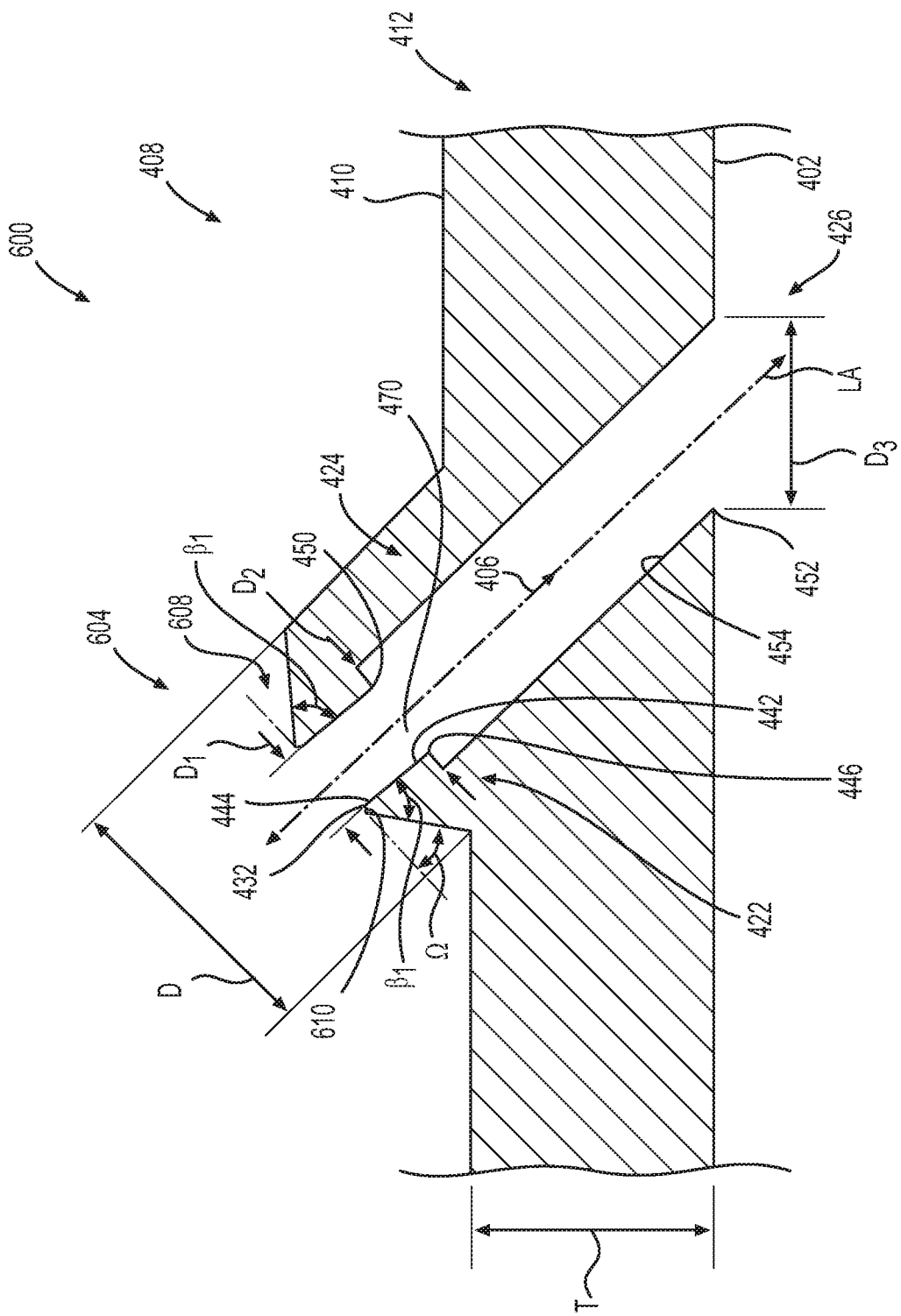
FIG. 6 is a cross-sectional view of another exemplary one of a plurality of plug resistant effusion cooling holes for use with the component of the gas turbine engine of FIG. 1, such as the turbine blade of FIGS. 2A and 2B and/or the combustor of FIGS. 3A and 3B, in accordance with various embodiments.

It should be noted that in other embodiments, one or more of the effusion cooling holes 400 associated with the component 408 (turbine blade 200 (FIGS. 2A and 2B) and/or the inner liner 302 and outer liner 304 (FIGS. 3A and 3B)) may be configured differently to reduce plugging of the effusion cooling holes 400 with sand, fine dust particles or debris during the operation of the gas turbine engine 100. With reference to FIG. 6, an effusion cooling hole 600 is shown. As the effusion cooling hole 600 may include some of the same features as the effusion cooling hole 400 discussed with regard to FIGS. 1-5, the same reference numerals will be used to denote the same features. In this example, the effusion cooling hole 600 includes an inlet section 602, the diverging section 422, the intermediate or intermediate section 424 and the outlet 426. It should be noted that although the effusion cooling hole 600 is illustrated with the outlet 426 in the example of FIG. 4, the effusion cooling hole 600 may include the outlet 426 of FIG. 5 to enable the application of the thermal barrier coating 520, if desired. The effusion cooling hole 600 extends along the longitudinal axis LA, which is transverse or oblique to the cold surface 410. In this example, the longitudinal axis LA is at an angle of about 45 degrees relative to the cold surface 410.

In one example, the inlet section 602, the diverging section 422 and a portion of the intermediate section 424 are defined so as to be positioned exterior to or above the cold surface 410 of the component 408. Stated another way, the inlet section 602, the diverging section 422 and the portion of the intermediate section 424 are defined exterior of the wall 412 and outside of the thickness T of the wall 412. By defining the inlet section 602, the diverging section 422 and the portion of the intermediate section 424 outside of the wall 412, outside of the thickness T and exterior to the cold surface 410 of the component 408, the inlet section 602, the diverging section 422 and the portion of the intermediate section 424 may act as heat transfer fins, which further assist in cooling the component 408. In this example, the inlet section 602 and the diverging section 422 are defined wholly external to the thickness T or wholly exterior to the wall 412 to act as heat transfer fins to assist in cooling. It should be noted that in other embodiments, a portion of the inlet section 602 and/or the diverging section 422 may be defined within the thickness T, if desired.

Figure 6A:
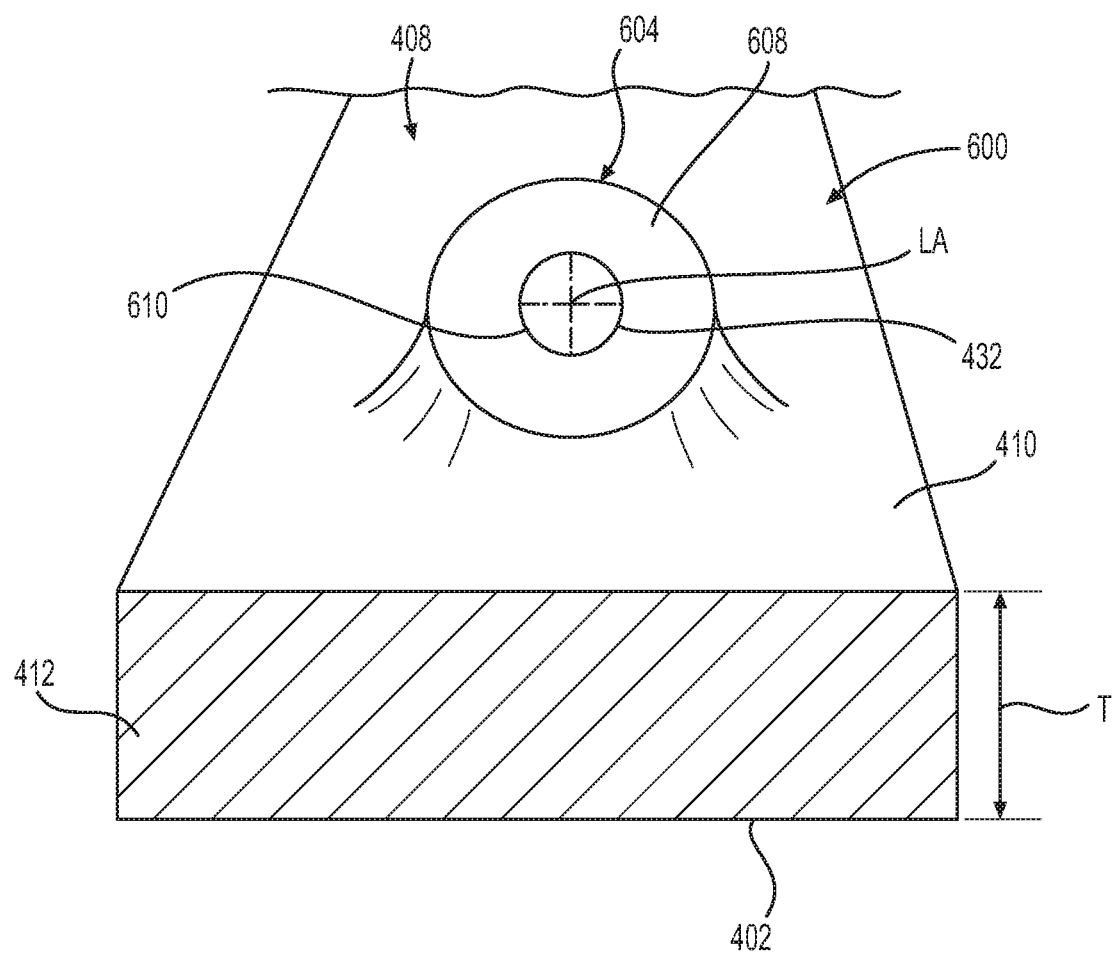
FIG. 6A is a detail perspective end view of the one of the plurality of plug resistant effusion cooling holes of FIG. 6, which illustrates an inlet section of the one of the plurality of plug resistant effusion cooling holes.

The inlet section 602 guides cooling fluid or air into the effusion cooling hole 600 and is spaced apart from the cold surface 410. The inlet section 602 is defined exterior to the wall 412, which enables a reduction in the thickness T. In one example, a face 604 of the inlet section 602 is defined as a surface of revolution about the longitudinal axis LA, and is not normal to the longitudinal axis LA, but rather the surface of revolution has an angle Ω relative to the normal of the longitudinal axis LA. The angle Ω is between about 0 degrees to about 45 degrees. The inlet section 602 includes the face 604 and defines the opening 432. In this example, the face 604 includes the surface of revolution or a ramped portion 608 defined about the inlet or opening 432. The face 604 is sized to have the diameter D, which is different than the first diameter D1 of the opening 432. In one example, the face 604 has the diameter D, which is about 0.5 to about 3.0 times greater than the first diameter D1. Thus, revolving around the longitudinal axis LA, there is a distance of about 0.5 to about 3.0 times the first diameter D1 between the cold surface 410 and the opening 432. The ramped portion 608 increases the angle of approach (more than about 90 degrees) between the cooling fluid 406 entering parallel to the face 604 and the longitudinal axis LA. A turn of greater than 90 degrees for the cooling fluid 406 into the inlet or opening 432 results in fine particles being concentrated more to the middle of the opening 432, and closer to the longitudinal axis LA. Further, by the cooling fluid 406 entering the opening 432 substantially normal to the face 604, fine particles entrained in the cooling fluid 406 are forced toward the center of the intermediate section 424, and thus, do not accumulate within the intermediate section 424. This also ensures that the effusion cooling holes 600 remain unplugged or free of fine particle accumulation during use. With reference to FIG. 6A, the face 604 is symmetric about the longitudinal axis LA.

The opening 432 is defined through the face 604. In one example, the opening 432 is circular, and is coaxially aligned with the longitudinal axis LA. Generally, the opening 432 is symmetric along the longitudinal axis LA. In this example, the opening 432 is defined through the face 604 such that a corner 610 is defined about a perimeter of the opening 432. The corner 610 assists in directing the cooling fluid 406 toward the center of the intermediate section 424. In one example, the corner 610 defines an angle β1 between the wall 442 of the diverging section 422 and the face 604. In this example, the angle β1 is about 45 degrees, such that the corner 610 is a soft corners. The opening 432 is defined off of the cold surface 410.

The diverging section 422 is downstream of the opening 432 of the inlet section 420 and is upstream from the outlet 426 in the direction of the cooling fluid 406 flow. The diverging section 422 is generally cylindrical, with the circular cross-section, and is substantially symmetric to the longitudinal axis LA. As discussed, the diverging section 422 is defined substantially external to the thickness T. The diverging section inlet 444 has the first diameter D1. The diverging section outlet 446 has the second diameter D2, which is different than the first diameter D1. As shown in FIG. 6, the effusion cooling hole 600 transitions from the first diameter D1 to the second diameter D2 at the diverging section 422. The intermediate section 424 is downstream of the diverging section 422. The intermediate section 424 is generally cylindrical, with the circular cross-section, and is substantially symmetric to the longitudinal axis LA. As discussed, the intermediate inlet 450 is in fluid communication with the diverging section outlet 446 of the diverging section 422, and the intermediate outlet 452 is in fluid communication with the outlet 426. The intermediate inlet 450 is defined external to the cold surface 410 and the wall 412, while a portion of the intermediate outlet 452 is defined within the wall 412. In this example, the intermediate section 424 extends through an entirety of the thickness T and through an entirety of the wall 412, and terminates at the outlet 426, which is defined on the hot surface 402.

The outlet 426 is downstream of the intermediate section 424 and is in fluid communication with the intermediate outlet 452. The outlet 426 dispenses the cooling fluid or air onto the hot surface 402 of the component 408. In one example, the outlet 426 has the major diameter D3. The major diameter D3 is different than each of the diameter D, the first diameter D1 and the second diameter D2. It should be noted that the outlet 426 may comprise the outlet 426 shown in FIG. 5.

Generally, the effusion cooling hole 600 may be oriented in any suitable direction relative to local or mainstream air flows. The outlet 426 of each of the effusion cooling holes 600 cooperates to form a film of cooling fluid over the hot surface 402 of the component 408. Similarly, in one example, the component 408 is formed with a plurality of the effusion cooling holes 600 extending exterior to the cold surface 410 and with the portion of the intermediate section 424 extending through the wall 412 in a predetermined density and orientation to provide a predetermined amount of cooling for the component 408. In this example, the effusion cooling holes 600 and the component 408 are composed of a metal or metal alloy, including, but not limited to nickel or cobalt based alloys. The effusion cooling holes 600 and the component 408 are formed through additive manufacturing, including, but not limited to direct metal laser sintering (DMLS), directed energy deposit (DED), laser powder bed fusion (L-PBF), electron powder bed fusion (E-PBF) or electron beam melting (EBM). The shape of the effusion cooling holes 600 enables the effusion cooling holes 600 to be self-supporting during formation through additive manufacturing.

Figure 7:
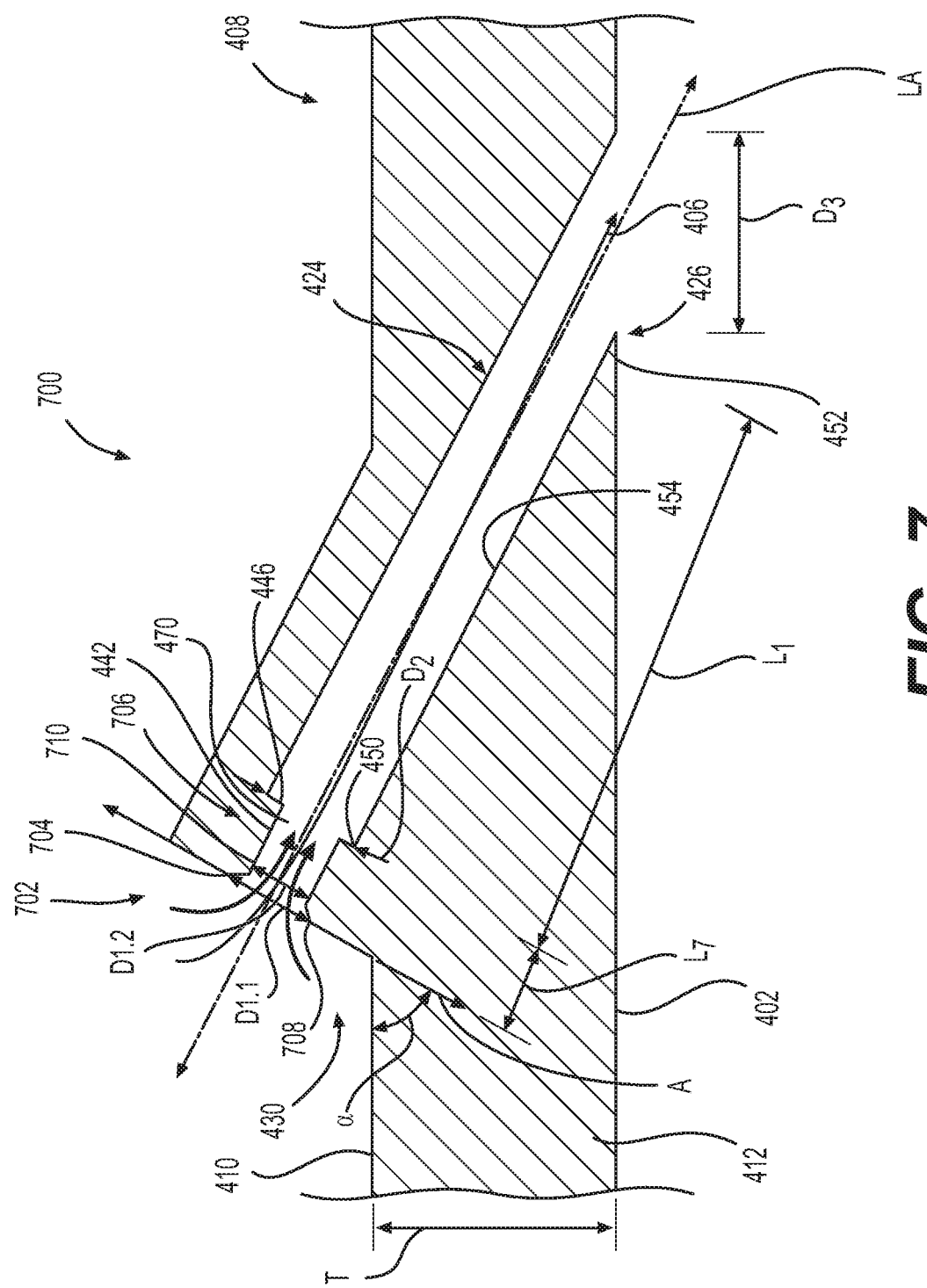
FIG. 7 is a cross-sectional view of another exemplary one of a plurality of plug resistant effusion cooling holes for use with the component of the gas turbine engine of FIG. 1, such as the turbine blade of FIGS. 2A and 2B and/or the combustor of FIGS. 3A and 3B, in accordance with various embodiments.

It should be noted that in other embodiments, one or more of the effusion cooling holes 400 associated with the component 408 (turbine blade 200 (FIGS. 2A and 2B) and/or the inner liner 302 and outer liner 304 (FIGS. 3A and 3B)) may be configured differently to reduce plugging of the effusion cooling holes 400 with sand, fine dust particles or debris during the operation of the gas turbine engine 100. With reference to FIG. 7, an effusion cooling hole 700 is shown. As the effusion cooling hole 700 may include some of the same features as the effusion cooling hole 400 discussed with regard to FIGS. 1-5, the same reference numerals will be used to denote the same features. In this example, the effusion cooling hole 700 includes an inlet section 702, a diverging section 706, the intermediate or intermediate section 424 and the outlet 426. It should be noted that although the effusion cooling hole 700 is illustrated with the outlet 426 in the example of FIG. 4, the effusion cooling hole 700 may include the outlet 426 of FIG. 5 to enable the application of the thermal barrier coating 520, if desired. The effusion cooling hole 700 extends along the longitudinal axis LA, which is transverse or oblique to the cold surface 410. In this example, the longitudinal axis LA is at an angle of about 45 degrees relative to the cold surface 410.

In one example, the inlet section 702, the diverging section 706 and a portion of the intermediate section 424 are defined so as to be positioned exterior to or above the cold surface 410 of the component 408. Stated another way, the inlet section 702, the diverging section 706 and the portion of the intermediate section 424 are defined exterior of the wall 412 and outside of the thickness T of the wall 412. By defining the inlet section 702, the diverging section 706 and the portion of the intermediate section 424 outside of the wall 412, outside of the thickness T and exterior to the cold surface 410 of the component 408, the inlet section 702, the diverging section 706 and the portion of the intermediate section 424 may act as heat transfer fins, which further assist in cooling the component 408. In this example, the inlet section 702 and the diverging section 706 are defined wholly external to the thickness T or wholly exterior to the wall 412 to act as heat transfer fins to assist in cooling. Thus, generally, the diverging section 706 is defined such that greater than 80% of the diverging section 706 is external to the thickness T. It should be noted that in other embodiments, a portion of the inlet section 702 and/or the diverging section 706 may be defined within the thickness T, if desired.

The inlet section 702 guides cooling fluid or air into the effusion cooling hole 700 and is spaced apart from the cold surface 410. The inlet section 702 is defined exterior to the wall 412, which enables a reduction in the thickness T. In one example, the inlet section 702 includes the face 430 and defines an inlet or opening 704. In this example, the face 430 is planar, and is orientated along the axis A. The axis A is transverse to the cold surface 410, and in one example, the axis A extends at the angle α relative to the cold surface 410. The face 430 is sized to have the diameter D, which is different than a diameter D1.1 of the opening 704. In one example, the face 430 has the diameter D, which is about 0.5 to about 3.0 times greater than the diameter D1.1. The diameter D1.1 is about 0.020 inches (in.) to about 0.030 inches (in.). Thus, revolving around the longitudinal axis LA, there is a distance of about 0.5 to about 3.0 times the diameter D1.1 between the cold surface 410 and the opening 432. Generally, the planar face 430, which is angled at the angle α, causes the cooling fluid 406 to enter the opening 704 substantially normal to the face 430. By the cooling fluid 406 entering the opening 704 substantially normal to the face 430, fine particles entrained in the cooling fluid 406 are forced toward the center of the intermediate section 424, and thus, do not accumulate within the intermediate section 424. This ensures that the effusion cooling holes 700 remain unplugged or free of fine particle accumulation during use.

The opening 704 is defined through the face 430. In one example, the opening 704 is circular, and is coaxially aligned with the longitudinal axis LA. Generally, the opening 704 is symmetric along the longitudinal axis LA. It should be noted that the opening 704 may have other shapes, if desired. In this example, the opening 704 is defined through the face 430 so as to include a tapered surface 708 from the face 430 to the intermediate section 424 about a perimeter of the opening 704. In one example, the tapered surface 708 has a conical taper, such that the diameter D1.1 is different than a first diameter D1.2, and in one example, the diameter D1.1 is greater than the first diameter D1.2. The tapered surface 708 assists in directing the cooling fluid toward the center of the intermediate section 424. The opening 704 is defined off of the cold surface 410. By positioning the opening 704 off of the cold surface 410 and exterior to the wall 412, the thickness T of the component 408 may be reduced in between the effusion cooling holes 700 in order to reduce the weight and material associated with the component 408.

The diverging section 706 is downstream of the opening 704 of the inlet section 702 and is upstream from the outlet 426 in the direction of the cooling fluid 406 flow. The diverging section 706 is generally cylindrical, with a circular cross-section, and is substantially symmetric to the longitudinal axis LA. The diverging section 706 is defined substantially external to the thickness T. In one example, the diverging section 706 is defined between about 80% to about 100% external to the thickness T, and thus, external to the wall 412. In this example, the diverging section 706 is defined wholly external to the thickness T (i.e. 100%). The diverging section 706 has a diverging section inlet 710 and the diverging section outlet 446. The wall 442 connects the diverging section inlet 444 with the diverging section outlet 446. The diverging section inlet 710 is in fluid communication with the opening 704 to receive the cooling fluid 406. The diverging section inlet 710 has the first diameter D1.2. The diverging section outlet 446 has a second diameter D2, which is different than the first diameter D1.2. In one example, the second diameter D2 is greater than the diameter D1.1 and the first diameter D1.2. A wall 442 of the diverging section 706 is symmetric about the longitudinal axis LA, and is substantially cylindrical. As shown in FIG. 7, the effusion cooling hole 700 transitions from the first diameter D1.2 to the second diameter D2 at the diverging section 706. The diverging section 706 extends for a length L7, which is different than a length L1 of the intermediate section 424. Generally, the length L7 is less than the length L1. In this example, the length L7 is about 0.01 inches (in.) to about 0.03 inches (in.). The diverging section inlet 710 is spaced apart from the diverging section outlet 446 by the length L7.

The intermediate section 424 is downstream of the diverging section 706. The intermediate section 424 is generally cylindrical, with the circular cross-section, and is substantially symmetric to the longitudinal axis LA. As discussed, the intermediate inlet 450 is in fluid communication with the diverging section outlet 446 of the diverging section 422, and the intermediate outlet 452 is in fluid communication with the outlet 426. The intermediate inlet 450 is defined external to the cold surface 410 and the wall 412, while a portion of the intermediate outlet 452 is defined within the wall 412. In this example, the intermediate section 424 extends through an entirety of the thickness T and through an entirety of the wall 412, and terminates at the outlet 426, which is defined on the hot surface 402.

The outlet 426 is downstream of the intermediate section 424 and is in fluid communication with the intermediate outlet 452. The outlet 426 dispenses the cooling fluid or air onto the hot surface 402 of the component 408. In one example, the outlet 426 has the major diameter D3. The major diameter D3 is different than each of the diameter D, the diameter D1.1, the first diameter D1.2 and the second diameter D2. It should be noted that the outlet 426 may comprise the outlet 426 shown in FIG. 5.

Generally, the effusion cooling hole 700 may be oriented in any suitable direction relative to local or mainstream air flows. The outlet 426 of each of the effusion cooling holes 700 cooperates to form a film of cooling fluid over the hot surface 402 of the component 408. Similarly, in one example, the component 408 is formed with a plurality of the effusion cooling holes 700 extending exterior to the cold surface 410 and with the portion of the intermediate section 424 extending through the wall 412 in a predetermined density and orientation to provide a predetermined amount of cooling for the component 408. In this example, the effusion cooling holes 700 and the component 408 are composed of a metal or metal alloy, including, but not limited to nickel or cobalt based alloys. The effusion cooling holes 700 and the component 408 are formed through additive manufacturing, including, but not limited to direct metal laser sintering (DMLS), directed energy deposit (DED), laser powder bed fusion (L-PBF), electron powder bed fusion (E-PBF) or electron beam melting (EBM). The shape of the effusion cooling holes 700 enables the effusion cooling holes 700 to be self-supporting during formation through additive manufacturing.

Figure 8:
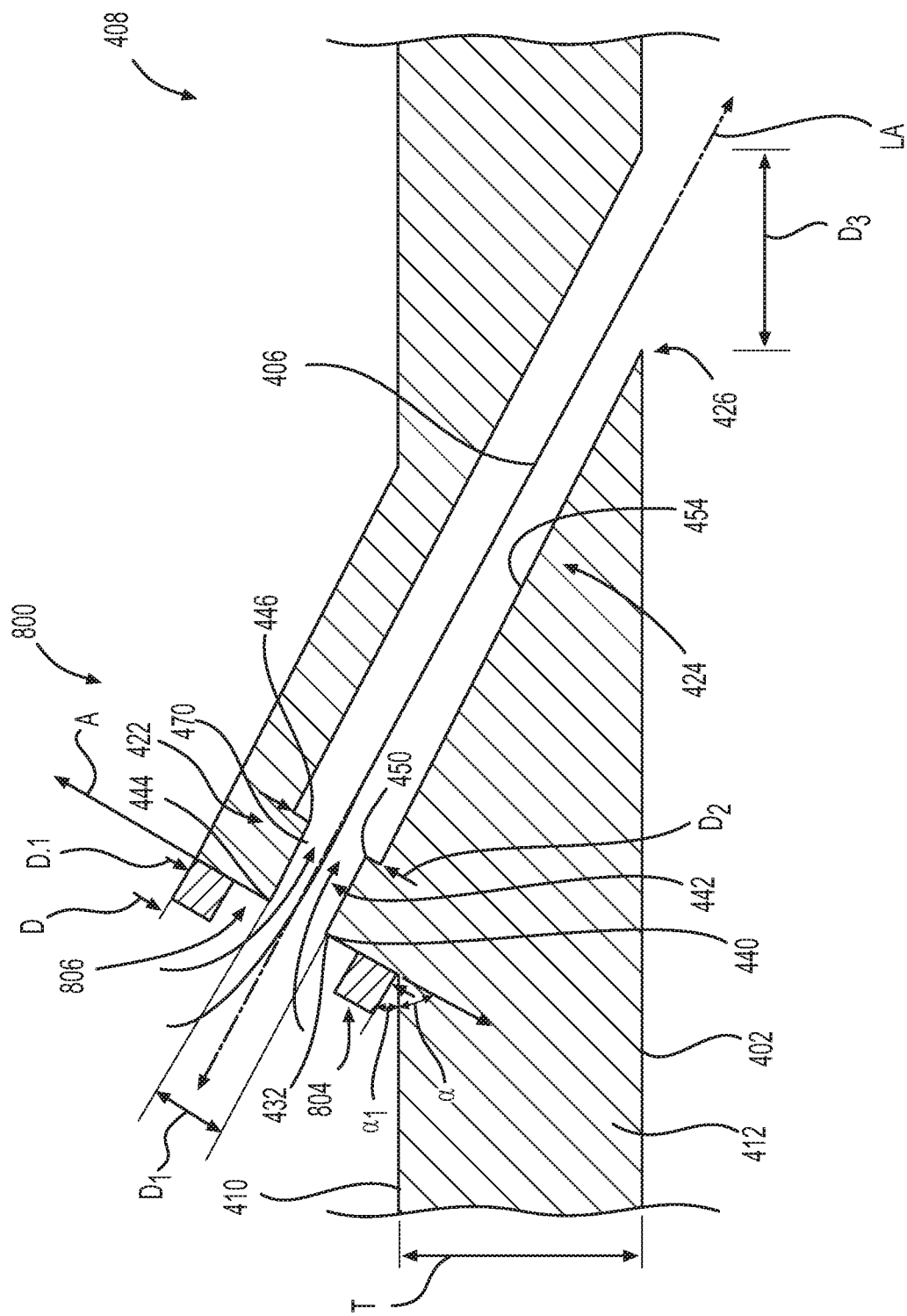
FIG. 8 is a cross-sectional view of another exemplary one of a plurality of plug resistant effusion cooling holes for use with the component of the gas turbine engine of FIG. 1, such as the turbine blade of FIGS. 2A and 2B and/or the combustor of FIGS. 3A and 3B, in accordance with various embodiments.

It should be noted that in other embodiments, one or more of the effusion cooling holes 400 associated with the component 408 (turbine blade 200 (FIGS. 2A and 2B) and/or the inner liner 302 and outer liner 304 (FIGS. 3A and 3B)) may be configured differently to reduce plugging of the effusion cooling holes 400 with sand, fine dust particles or debris during the operation of the gas turbine engine 100. With reference to FIG. 8, an effusion cooling hole 800 is shown. As the effusion cooling hole 800 may include some of the same features as the effusion cooling hole 400 discussed with regard to FIGS. 1-5, the same reference numerals will be used to denote the same features. In this example, the effusion cooling hole 800 includes an inlet section 802, the diverging section 422, the intermediate or intermediate section 424 and the outlet 426. It should be noted that although the effusion cooling hole 800 is illustrated with the outlet 426 in the example of FIG. 4, the effusion cooling hole 800 may include the outlet 426 of FIG. 5 to enable the application of the thermal barrier coating 520, if desired. The effusion cooling hole 800 extends along the longitudinal axis LA, which is transverse or oblique to the cold surface 410. In this example, the longitudinal axis LA is at an angle of about 45 degrees relative to the cold surface 410.

In one example, the inlet section 802, the diverging section 422 and a portion of the intermediate section 424 are defined so as to be positioned exterior to or above the cold surface 410 of the component 408. Stated another way, the inlet section 802, the diverging section 422 and the portion of the intermediate section 424 are defined exterior of the wall 412 and outside of the thickness T of the wall 412. By defining the inlet section 802, the diverging section 422 and the portion of the intermediate section 424 outside of the wall 412, outside of the thickness T and exterior to the cold surface 410 of the component 408, the inlet section 802, the diverging section 422 and the portion of the intermediate section 424 may act as heat transfer fins, which further assist in cooling the component 408. In this example, the inlet section 802 and the diverging section 422 are defined wholly external to the thickness T or wholly exterior to the wall 412 to act as heat transfer fins to assist in cooling. It should be noted that in other embodiments, a portion of the inlet section 802 and/or the diverging section 422 may be defined within the thickness T, if desired.

The inlet section 802 guides cooling fluid or air into the effusion cooling hole 800 and is spaced apart from the cold surface 410. The inlet section 802 is defined exterior to the wall 412, which enables a reduction in the thickness T. In one example, the inlet section 802 includes a guide flange 804, a face 806 and defines the inlet or opening 432. The guide flange 804 surrounds a perimeter of the face 806, and extends outwardly from the face 806 away from the cold surface 410. In one example, the guide flange 804 extends at an angle α1 relative to the cold surface 410. The angle α1 is between about 15 degrees to about 25 degrees, and in one example is about 20 degrees. It should be noted, however, that other angles may be suitable. The guide flange 804 directs the cooling fluid 406 into the opening 432 in case of higher crossflow of the cooling fluid 406 relative to the cold surface 410. The guide flange 804 is illustrated herein with a substantially square or rectangular cross-section; however, the guide flange 804 may have any desired shape, and may include curved or rounded edges, if desired.

The face 806 is planar, and is orientated along the axis A. In this example, the guide flange 804 and the face 806 are symmetric relative to the longitudinal axis LA. The axis A is transverse to the cold surface 410, and in one example, the axis A extends at the angle α relative to the cold surface 410. In this example, the guide flange 804 is sized to have the diameter D, which is different than the first diameter D1 of the opening 432. The face 806 has a diameter D.1, which is different than the diameter D, and in this example, is less than the diameter D. In one example, the guide flange 804 has the diameter D, which is about 0.5 to about 3.0 times greater than the first diameter D1 of the opening 432. The diameter D.1 is about 0.04 inches (in.) to about 0.1 inches (in.). Thus, revolving around the longitudinal axis LA, there is a distance of about 0.5 to about 3.0 times the first diameter D1 between the cold surface 410 and the opening 432, which in this example is concentric with the guide flange 804. Generally, the planar face 806, which is angled at the angle α, cooperates with the guide flange 804 to cause the cooling fluid 406 to enter the opening 432 substantially normal to the face 806. By the cooling fluid 406 entering the opening 432 substantially normal to the face 806, fine particles entrained in the cooling fluid 406 are forced to the center of the intermediate section 424, and thus, do not accumulate within the intermediate section 424. This ensures that the effusion cooling holes 800 remain unplugged or free of fine particle accumulation during use.

The opening 432 is defined through the face 806. In one example, the opening 432 is circular, and is coaxially aligned with the longitudinal axis LA. Generally, the opening 432 is symmetric along the longitudinal axis LA. In this example, the opening 432 is defined through the face 806 such that the corner 440 is defined about a perimeter of the opening 432. The corner 440 assists in directing the cooling fluid toward the center of the intermediate section 424. The opening 432 is defined off of the cold surface 410. By positioning the opening 432 off of the cold surface 410 and exterior to the wall 412, the thickness T of the component 408 may be reduced in between the effusion cooling holes 800 in order to reduce the weight and material associated with the component 408.

The diverging section 422 is downstream of the opening 432 of the inlet section 420 and is upstream from the outlet 426 in the direction of the cooling fluid 406 flow. The diverging section 422 is generally cylindrical, with the circular cross-section, and is substantially symmetric to the longitudinal axis LA. As discussed, the diverging section 422 is defined substantially external to the thickness T. The diverging section inlet 444 has the first diameter D1. The diverging section outlet 446 has the second diameter D2, which is different than the first diameter D1. As shown in FIG. 8, the effusion cooling hole 800 transitions from the first diameter D1 to the second diameter D2 at the diverging section 422. The intermediate section 424 is downstream of the diverging section 422. The intermediate section 424 is generally cylindrical, with the circular cross-section, and is substantially symmetric to the longitudinal axis LA. As discussed, the intermediate inlet 450 is in fluid communication with the diverging section outlet 446 of the diverging section 422, and the intermediate outlet 452 is in fluid communication with the outlet 426. The intermediate inlet 450 is defined external to the cold surface 410 and the wall 412, while a portion of the intermediate outlet 452 is defined within the wall 412. In this example, the intermediate section 424 extends through an entirety of the thickness T and through an entirety of the wall 412, and terminates at the outlet 426, which is defined on the hot surface 402.

The outlet 426 is downstream of the intermediate section 424 and is in fluid communication with the intermediate outlet 452. The outlet 426 dispenses the cooling fluid or air onto the hot surface 402 of the component 408. In one example, the outlet 426 has the major diameter D3. The major diameter D3 is different than each of the diameter D, the diameter D.1, the first diameter D1 and the second diameter D2. It should be noted that the outlet 426 may comprise the outlet 426 shown in FIG. 5.

Generally, the effusion cooling hole 800 may be oriented in any suitable direction relative to local or mainstream air flows. The outlet 426 of each of the effusion cooling holes 800 cooperates to form a film of cooling fluid over the hot surface 402 of the component 408. Similarly, in one example, the component 408 is formed with a plurality of the effusion cooling holes 800 extending exterior to the cold surface 410 and with the portion of the intermediate section 424 extending through the wall 412 in a predetermined density and orientation to provide a predetermined amount of cooling for the component 408. In this example, the effusion cooling holes 800 and the component 408 are composed of a metal or metal alloy, including, but not limited to nickel or cobalt based alloys. The effusion cooling holes 800 and the component 408 are formed through additive manufacturing, including, but not limited to direct metal laser sintering (DMLS), directed energy deposit (DED), laser powder bed fusion (L-PBF), electron powder bed fusion (E-PBF) or electron beam melting (EBM). The shape of the effusion cooling holes 800 enables the effusion cooling holes 800 to be self-supporting during formation through additive manufacturing.

Thus, the effusion cooling holes 400, 600, 700, 800 associated with the component 408 (which corresponds to the turbine blade 200 (FIGS. 2A and 2B) and/or the inner liner 302 and outer liner 304 (FIGS. 3A and 3B)) of the gas turbine engine 100 (FIG. 1) reduces plugging of the effusion cooling holes 400, 600, 700, 800 with sand, fine dust particles or debris during the operation of the gas turbine engine 100 by providing the face 430, 604, 806 at the inlet or opening 432, 704 of the inlet section 420, 602, 702, 802 and the diverging section 422, 706 downstream of the opening 432, 704. By providing the diverging section 422, 706 in which the diameter of the effusion cooling hole 400, 600, 700, 800 transitions from the first diameter D1, D1.2 to the second diameter D2 substantially external to the thickness T, a vena contracta 470 (FIGS. 4-8) is formed by and within the diverging section 422, 706. Generally, the vena contracta 470 is a point in the effusion cooling hole 400 where the diameter is the least (the first diameter D1, D1.2 is less than the second diameter D2), while the velocity of the cooling fluid 406 is at a maximum. The vena contracta 470 causes fine particles, such as sand and dust with a particle size of about 1 micrometer (μm) to about 10 micrometers (μm), to be pushed toward the inner diameter of the flow of the cooling fluid 406. The outlet 426 has a wider diameter than the second diameter D2, for example, the major diameter D3 (FIG. 4) or the fourth diameter D4 (FIG. 4), which causes the fine particles to remain along the longitudinal axis LA of the effusion cooling hole 400, 600, 700, 800 and away from the intermediate sidewall 454 of the intermediate section 424 for the outlet 426 of FIGS. 4 and 6-8; and away from a sidewall 522 of the intermediate section 508 and a sidewall 524 of the outlet 426. This ensures that the fine particles, such as sand and dust, do not accumulate within the effusion cooling hole 400, 600, 700, 800 and thereby inhibits a plugging of the effusion cooling hole 400, 600, 700, 800 by the fine particles. In one example, the plugging of the effusion cooling holes 400, 600, 700, 800 is reduced by about 90% when compared to a conventional effusion hole.

Further, by positioning the inlet section 420, 602, 702, 802, the diverging section 422, 706 and the portion of the intermediate section 424 external to the wall 412 or outside of the thickness T of the wall 412, the thickness T of the wall 412 itself may be reduced, which reduces a weight of the component 408. In addition, with regard to FIG. 5, the length of the outlet 426 enables the application of the thermal barrier coating 520 without plugging the respective one of the effusion cooling holes 400, 600, 700, 800, if desired. Additional wall roughness, turbulators or bumps may be added to the upstream side of the cold surface 410 in order to increase heat transfer to the cooling fluid 406 and to reduce the temperature of the wall 412, and thus, the component 408.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An effusion cooling hole for a component associated with a gas turbine engine, the component including a wall having a cold, first surface opposite a hot, second surface and a thickness defined between the first surface and the second surface, the effusion cooling hole extending along a longitudinal axis, the effusion cooling hole comprising:
    an inlet section spaced apart from the first surface, the inlet section including a face orientated transverse to the first surface and defining an inlet through the face that is symmetric to the longitudinal axis, the face extends about a perimeter of the inlet, the inlet having a first diameter, the face having a diameter that is greater than the first diameter, and at least a portion of the face is in contact with the first surface at a perimeter of the face;
    an outlet at the second surface and downstream from the inlet section, the outlet configured to form a film of a cooling fluid on the second surface, the outlet having an elliptical opening with a third major diameter that is different than the diameter;
    a diverging section downstream from the inlet section and upstream from the outlet, the diverging section is defined substantially external to the thickness, the effusion cooling hole transitions from the first diameter to a second diameter at the diverging section and the second diameter is larger than the first diameter; and
    an intermediate section that fluidly connects the diverging section to the outlet, the intermediate section defined at least through the thickness and having the second diameter from the diverging section to the outlet.

2. The effusion cooling hole of claim 1, wherein the face is planar, the face extends along a first axis that is transverse to the longitudinal axis and the first surface, and the face symmetric to the longitudinal axis.

3. The effusion cooling hole of claim 2, wherein the first axis is at a first angle relative to the first surface, and the first angle is between 10 degrees and 25 degrees.

4. The effusion cooling hole of claim 2, wherein the longitudinal axis is transverse to a first normal of the first surface and is transverse to a second normal of the second surface such that the inlet of the effusion cooling hole is offset from the outlet of the effusion cooling hole and the effusion cooling hole is angled through the wall of the component.

5. The effusion cooling hole of claim 1, wherein the diverging section is defined wholly external to the thickness and a portion of the intermediate section is defined external to the thickness.

6. The effusion cooling hole of claim 1, wherein the diverging section is defined such that greater than 80% of the diverging section is external to the thickness.

7. The effusion cooling hole of claim 1, wherein the third major diameter is greater than the second diameter and the first diameter.

8. The effusion cooling hole of claim 1, wherein the inlet is defined through the face to define a corner about the perimeter of the inlet between a wall of the diverging section and the face, the corner having a first angle that is between 45 and 90 degrees.

9. The effusion cooling hole of claim 1, further comprising a guide flange that surrounds and extends outwardly from the face.

10. The effusion cooling hole of claim 1, wherein the inlet includes a taper that extends from the face to the first diameter.

11. The effusion cooling hole of claim 1, wherein the face is planar, and is configured such that cooling fluid enters the inlet normal to the face.

12. The effusion cooling hole of claim 1, wherein the component is at least one of a turbine blade associated with the gas turbine engine, an inner liner of a combustor associated with the gas turbine engine and an outer liner of a combustor associated with the gas turbine engine.

13. The effusion cooling hole of claim 1, wherein the diverging section has a first length, the intermediate section has a second length, the second length is greater than the first length and the intermediate section is symmetric to the longitudinal axis.

14. The effusion cooling hole of claim 1, wherein the diverging section forms a vena *contracta* that is configured to inhibit the accumulation of fine particles within the effusion cooling hole.

15. An effusion cooling hole for a component associated with a gas turbine engine, the component including a wall having a cold, first surface opposite a hot, second surface and a thickness defined between the first surface and the second surface, the effusion cooling hole extending along a longitudinal axis and angled relative to the second surface, the effusion cooling hole comprising:
    an inlet section spaced apart from the first surface, the inlet section including a planar face orientated transverse to the first surface and defining an inlet through the planar face that is symmetric to the longitudinal axis, the inlet having a first diameter, the planar face having a diameter that is greater than the first diameter, and at least a portion of the planar face is in contact with the first surface at a perimeter of the planar face;

an outlet at the second surface and downstream from the inlet section, the outlet configured to form a film of a cooling fluid on the second surface, the outlet having an elliptical opening with a third major diameter that is different than the diameter;

a diverging section downstream from the inlet section and upstream from the outlet, the diverging section is defined substantially external to the thickness, the effusion cooling hole transitions from the first diameter to a second diameter at the diverging section, the second diameter is larger than the first diameter and the diverging section has a first length; and an intermediate section that extends from the diverging section to the outlet, the intermediate section symmetric to the longitudinal axis, the intermediate section defined at least through the thickness, the intermediate section has the second diameter from the diverging section to the outlet and the intermediate section has a second length that is greater than the first length of the diverging section.

16. The effusion cooling hole of claim 15, wherein the diverging section is defined wholly external to the thickness and a portion of the intermediate section is defined external to the thickness.

17. The effusion cooling hole of claim 15, wherein the diverging section is defined such that greater than 80% of the diverging section is external to the thickness.

18. The effusion cooling hole of claim 15, wherein the third major diameter is greater than the second diameter and the first diameter.

19. The effusion cooling hole of claim 15, wherein the planar face extends along a first axis transverse to the longitudinal axis and the first surface, the first axis is at a first angle relative to the first surface, the first angle is between 10 degrees and 25 degrees, and the planar face symmetric to the longitudinal axis.

20. An effusion cooling hole for a component associated with a gas turbine engine, the component including a wall having a cold, first surface opposite a hot, second surface and a thickness defined between the first surface and the second surface, the effusion cooling hole extending along a longitudinal axis and angled relative to the second surface, the effusion cooling hole comprising:

an inlet section spaced apart from the first surface, the inlet section including a planar face orientated along a first axis transverse to the first surface and the longitudinal axis, the first axis is at a first angle relative to the first surface, the first angle between 10 degrees and 25 degrees, the inlet section defining an inlet through the planar face that is symmetric to the longitudinal axis, the planar face surrounding the inlet and the inlet having a first diameter, the planar face having a diameter that is greater than the first diameter, and at least a portion of the planar face is in contact with the first surface at a perimeter of the planar face;

an outlet at the second surface and downstream from the inlet section, the outlet configured to form a film of a cooling fluid on the second surface, the outlet having an elliptical opening with a third major diameter that is different than the diameter;

a diverging section downstream from the inlet section and upstream from the outlet and the diverging section is defined wholly external to the thickness, the effusion cooling hole transitions from the first diameter to a second diameter at the diverging section, the second diameter is larger than the first diameter, smaller than the third diameter and smaller than the diameter, and the diverging section has a first length; and an intermediate section that fluidly connects the diverging section to the outlet, the intermediate section defined at least through the thickness, the intermediate section having the second diameter from the diverging section to the outlet and the intermediate section has a second length that is greater than the first length of the diverging section.

* * * * *